United States Patent [19]

Young et al.

[11] Patent Number: 5,925,880
[45] Date of Patent: Jul. 20, 1999

[54] NON UNIFORMITY COMPENSATION FOR INFRARED DETECTOR ARRAYS

[75] Inventors: Ching-ju Jennifer Young, Dallas; Robert C. Gibbons, Richardson; A-Lan Reynolds, Bedford, all of Tex.

[73] Assignee: Raytheon Company, Lexington, Mass.

[21] Appl. No.: 08/918,642

[22] Filed: Aug. 22, 1997

Related U.S. Application Data

[60] Provisional application No. 60/025,077, Aug. 30, 1996.
[51] Int. Cl.$^6$ ...................................................... H01J 40/14
[52] U.S. Cl. .................... 250/252.1; 250/332; 250/208.1
[58] Field of Search ............................. 250/252.1 R, 332, 250/334, 339.02, 349, 208.1; 358/446

[56] References Cited

U.S. PATENT DOCUMENTS 5,276,319 1/1994 Hepfer et al. ............................ 250/332
5,514,865 5/1996 O'Neil ................................. 250/208.1

*Primary Examiner*—Edward P. Westin
*Assistant Examiner*—Richard Hanig
*Attorney, Agent, or Firm*—Baker & Botts, L.L.P.

[57] ABSTRACT

Methods of calculating gain correction values and offset correction values for detector elements of an infrared detector array. The methods can be adapted for one-dimensional scanning arrays or for two-dimensional staring arrays. (FIGS. 3 and 6). The array is mechanically dithered so that two or more neighboring detector elements of the array look at the same location of a scene. (FIG. 3, Step 302; FIG. 6, Step 601). Then, the fields of pixel data are processed to calculate a gain correction value and an offset correction value for each detector element. (FIG. 3, Steps 305, 309, and 311; FIG. 6, Steps 603, 607, and 611). For each detector element, its gain error and its offset error are calculated from local averages, with the local average for a particular detector element including a term for that detector element as well as terms for its neighboring detector elements.

33 Claims, 13 Drawing Sheets

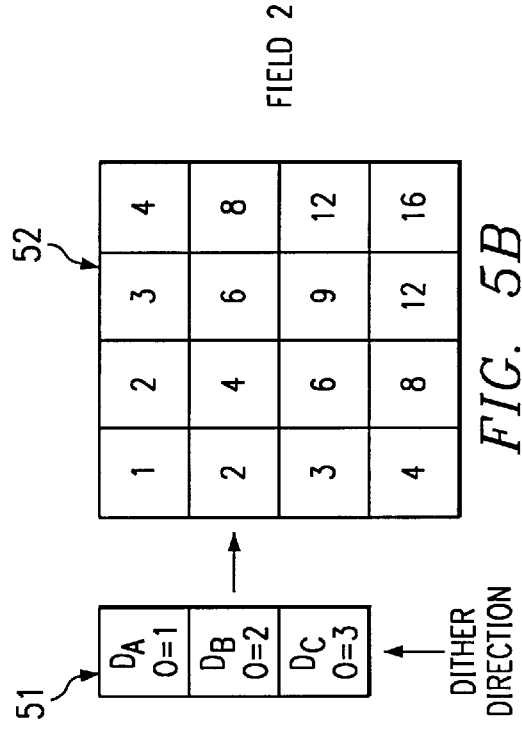
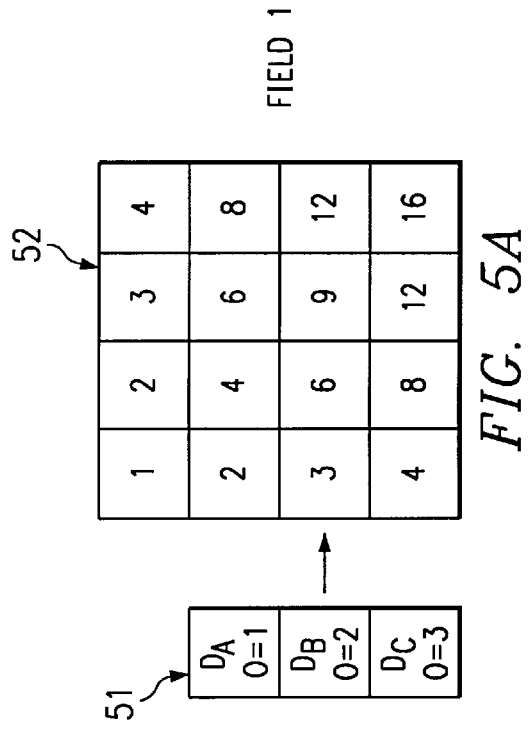
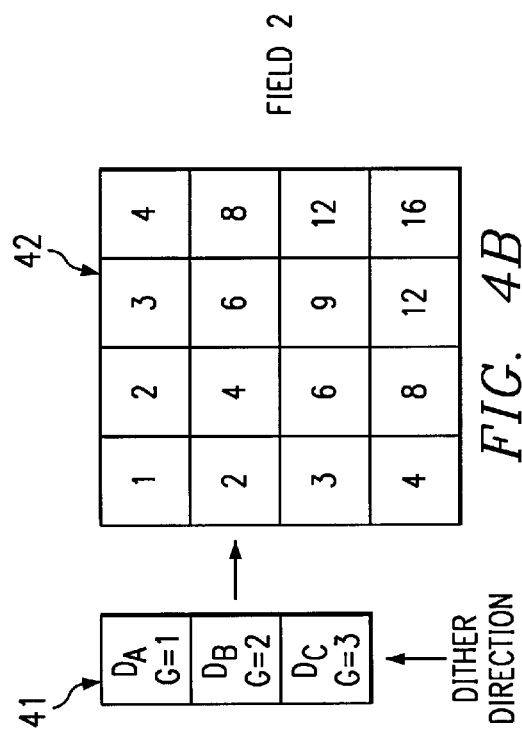
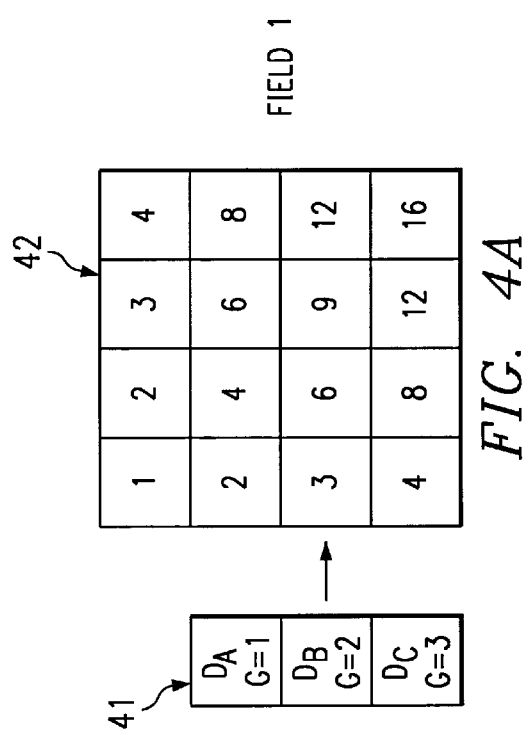

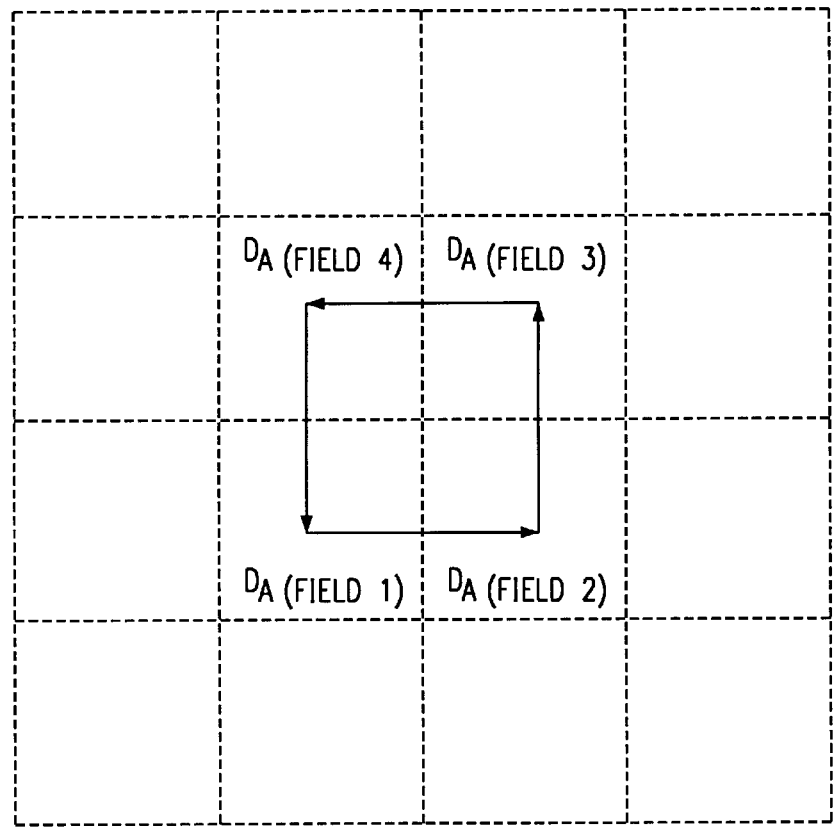
FIG. 7
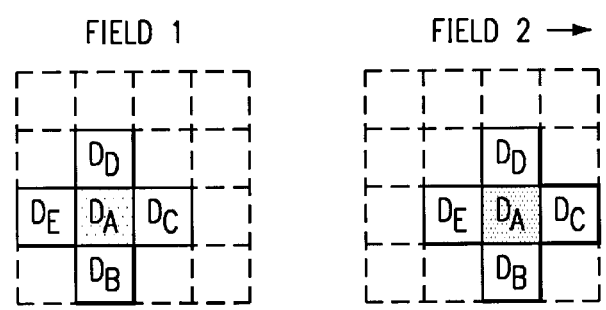
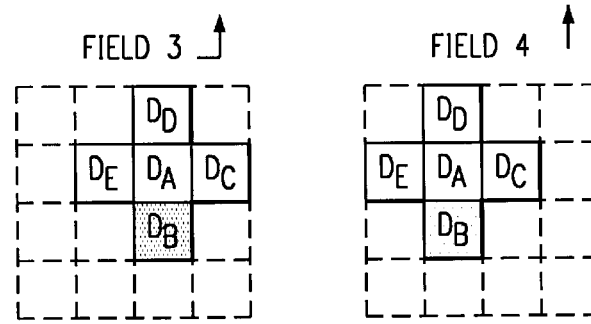
FIG. 8

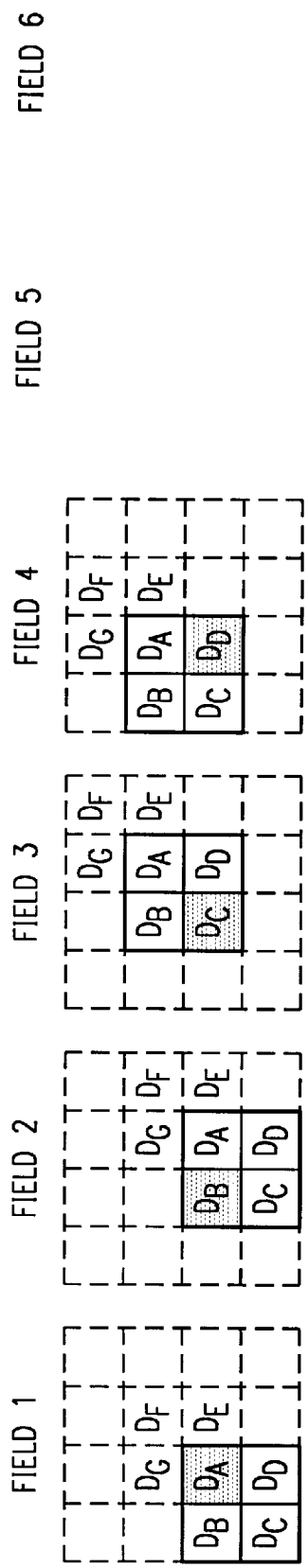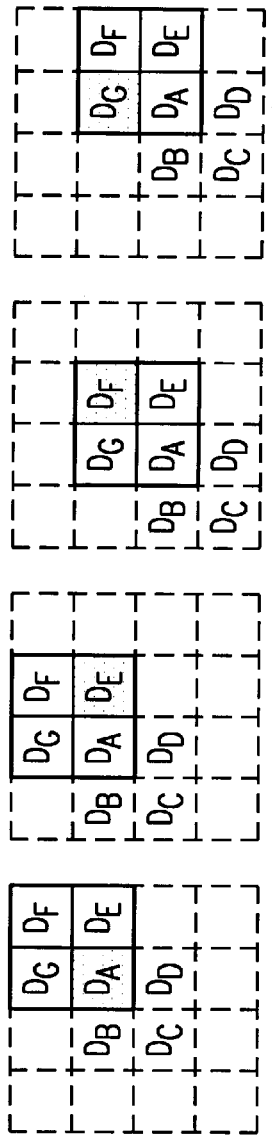
FIG. 9

FIG. 16
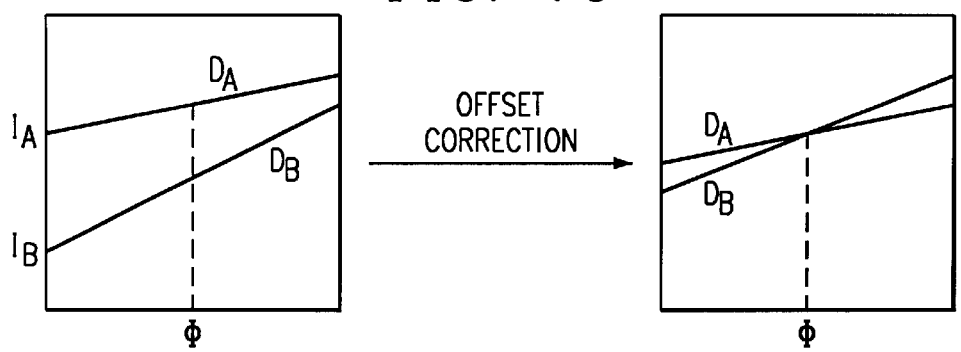
FIG. 17A
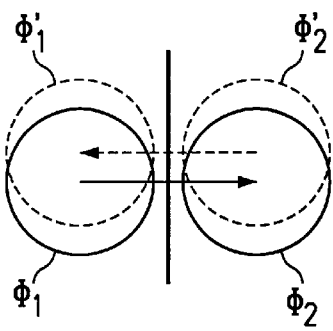
FIG. 17B
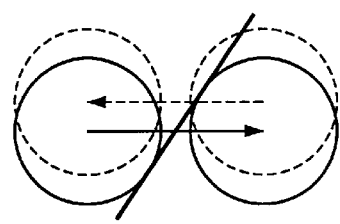
FIG. 17C
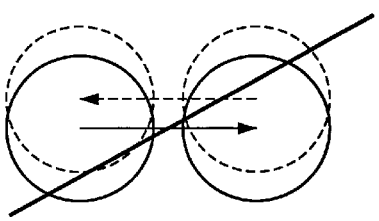
FIG. 17D
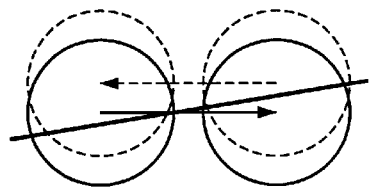
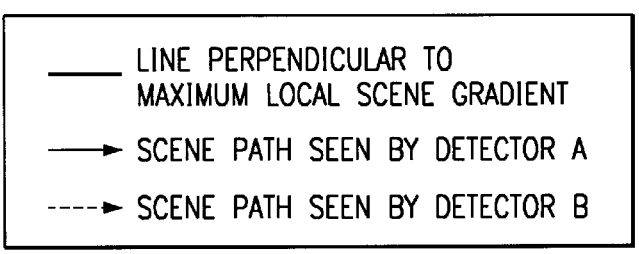
—— LINE PERPENDICULAR TO MAXIMUM LOCAL SCENE GRADIENT
——▶ SCENE PATH SEEN BY DETECTOR A
----▶ SCENE PATH SEEN BY DETECTOR B

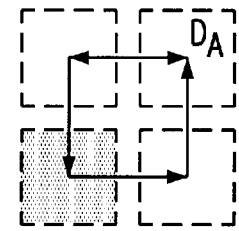
IMAGE SCENE (t)
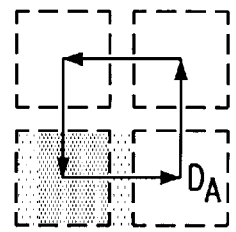
IMAGE SCENE (t+1)
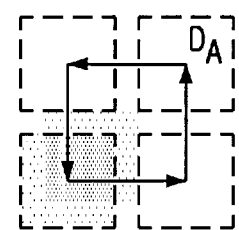
IMAGE SCENE (t+2)
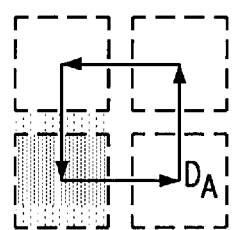
IMAGE SCENE (t+3)
*FIG. 18A*
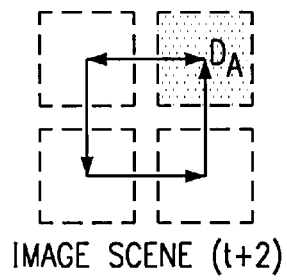
IMAGE SCENE (t+2)
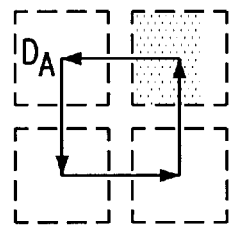
IMAGE SCENE (t+3)
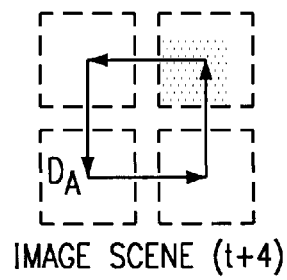
IMAGE SCENE (t+4)
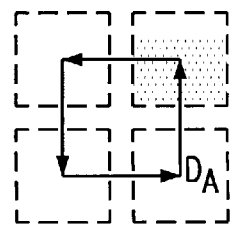
IMAGE SCENE (t+5)
*FIG. 18B*

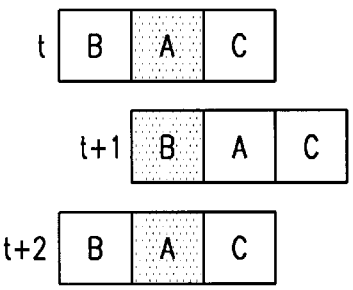 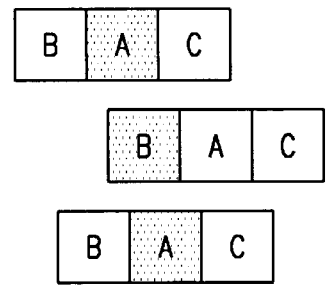
FIG. 19A          FIG. 19B
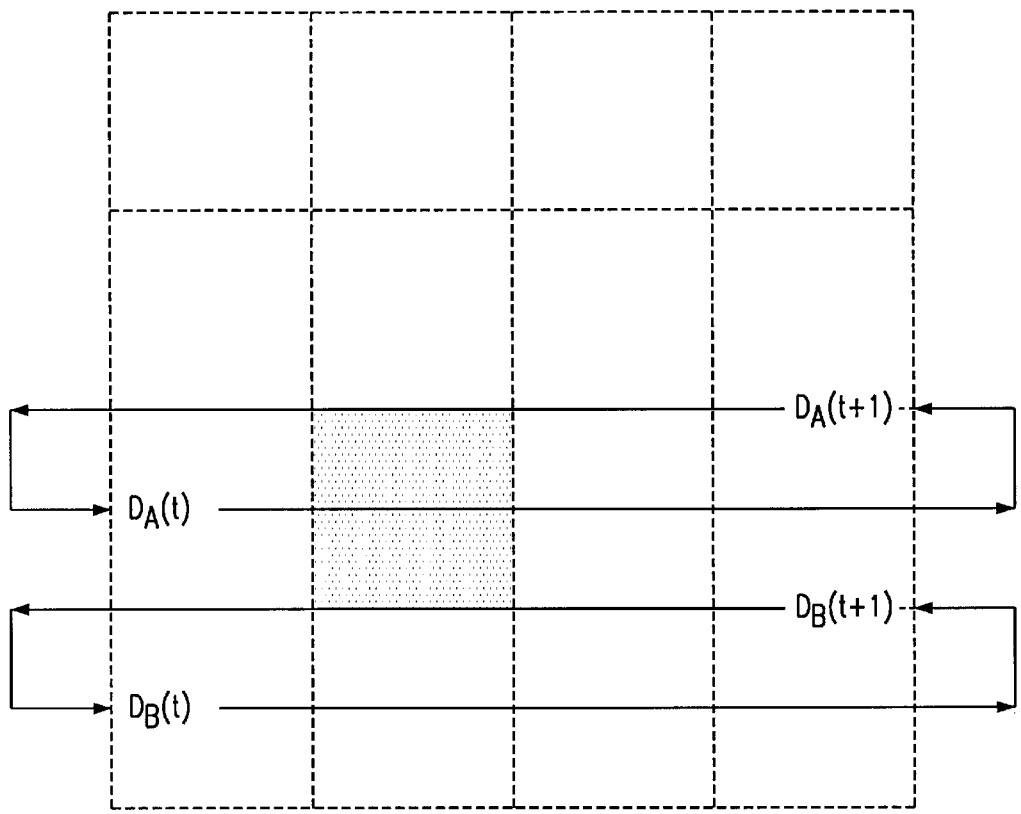
FIG. 20
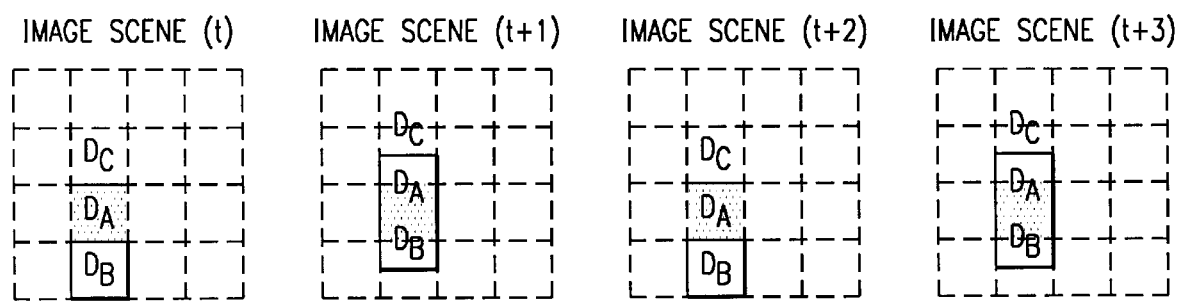
FIG. 21

NON UNIFORMITY COMPENSATION FOR INFRARED DETECTOR ARRAYS

CROSS REFERENCE TO RELATED APPLICATIONS

This application claims priority under 35 USC § 119 of provisional application No. 60/025,077, filed Aug. 30, 1996.

TECHNICAL FIELD OF THE INVENTION

The present invention relates generally to infrared detectors, and more particularly to a method of compensating for non uniformities among detector elements of an infrared detector array.

BACKGROUND OF THE INVENTION

Infrared detectors provide thermal images for temperature measurement and heat detection. They are used for various applications, such as for military, industrial, and medical applications. In its simplest form, an infrared detector is a device, such as a photosensitive diode, that generates an electric current when exposed to infrared radiation. This current is dependent on the intensity and wavelength of the radiation and can be used in many different ways to produce an infrared picture.

Infrared detectors may be configured as a single element (detector), a small array of elements, a long linear array, or a full two-dimensional array. When the detector is a full two-dimensional array, the entire image is recorded at once, and the array is referred to as a "staring" array. However, with smaller arrays, the image is scanned over the array. The small array requires a serial scan to sweep the image in two-dimensions, whereas the linear array requires a "push-broom" scan to sweep the image across the array in one dimension.

The current produced by an infrared detector is amplified and processed to provide a more useful detector output. The processing reduces interference due to external and internal causes, such as electrical noise.

The ideal response of an infrared detector array is that each detector element exhibit the same linear voltage response for given temperature changes in the irradiation of the array. However, one type interference with a good detector signal is electrical noise due to detector non-uniformity among detector elements. The uniformity differences have both spatially and temporally dependent causes.

A number of methods have been tried for compensating non uniformity of infrared detector arrays. Generally, all involve some sort of data processing. Some methods use a uniform calibration source, typically using a chopper and controlled temperature. Other methods are scene-based, which means that they use an image comprised of one or more objects or patterns. The scene-based methods may be further categorized into mechanical and non-mechanical methods.

The "dithered scan" method of non uniformity compensation is a scene-based mechanical method. The detector array views a scene through suitable optics. During a given time frame, the incident flux is sensed by each detector element. At the end of the time frame, the array data is delivered for processing and the array is displaced ("dithered") a fixed distance, typically a distance equal to the width or height of one detector element, in either the horizontal or vertical direction. The scene flux is assumed to be stable throughout the dither cycle. Thus, during the next time frame, each detector element is exposed to the flux seen by one of its neighbors during the prior time frame. These detector pairs can be "linked" analytically, such as by averaging their outputs. By a suitable choice of a dither pattern, each detector can be linked with several of its neighbors, to adjust gain and offset differences. A dithered scan approach is described in an article by William F. O'Neil, "Dithered Scan Detector Compensation", *Proc. IRIS Passive Detectors*, 1992, Vol. 1, pp. 123–134.

SUMMARY OF THE INVENTION

One aspect of the invention is a method of calculating gain and offset correction values for detector elements of an infrared detector array. The array is mechanically dithered with respect to the scene that is to be imaged. The dither motion is such that pairs of neighboring detector elements are exposed to the same scene flux. The method assumes the scene flux is stable over the dither cycle. With this assumption, neighborhood averaging is used to adjust gain and offset differences, based on their responses to the same scene irradiance gradient (for gain correction) or to the same scene irradiance (for offset correction). More specifically, for gain correction calculations, a detector element and its neighbors are exposed to the same scene path. This permits calculation of gain ratios (gradients) and local averages of these gain ratios, to determine a gain correction value for that detector element. For offset correction calculations, a detector element and its neighbors are exposed to the same scene flux. This permits calculation of a local response average, which is subtracted from the detector element's output to determine the output correction for that detector element.

The same dither pattern can be used for both gain correction and offset correction. In the simplest embodiments, the dithering is equal to the height or width of one detector element. Interpolation and extrapolation can be used for "non-integer" dithering.

For each detector element, a multiplicative gain correction factor is calculated and applied to that detector element's output. The method is iterative, such that new gain correction updates become constant (equal to unity), reducing gain errors to smaller and smaller errors. Then an offset correction is iteratively calculated and subtracted, such that the new offset correction updates become constant (equal to zero). The image can be displayed during the iterations with successively smoothed gain and offset errors, or the display can be delayed until the correction values become stable to some predetermined level.

The method can be mathematically described with matrix notation, which shows that the method is equivalent to a low pass filtering process. For each detector element, the calculations use local neighbor averages, which include values representing the detector element whose error is being calculated as well as values representing its neighbors. As a result, the method is a true low pass filter, as compared to previous techniques. It better smooths the high frequency components of the gain and offset matrices.

An advantage of the invention is that for offset correction, upper and lower neighbor local averages are alternatingly computed, which cancels the effect of dither bias (error between the intended and actual displacement of the detector array).

BRIEF DESCRIPTION OF THE DRAWINGS

FIGS. 4A and 4B illustrate a one dimensional array with gain errors and its dither motion.

FIGS. 5A and 5B illustrate a one dimensional array with offset errors and its dither motion.

FIG. 7 illustrates the dither pattern for a two-dimensional array.

FIG. 8 illustrates a detector element and its neighbors for purposes of gain correction for a two-dimensional array.

FIG. 9 illustrates a detector element and its neighbors for purposes of offset correction for a two-dimensional array.

FIGS. 12 and 13 illustrate two more diagonal dither patterns for two-dimensional arrays.

FIG. 16 illustrates the smoothing of gain errors for a "bland" scene.

FIGS. 17A–17D illustrate how two detector elements might be exposed to different scene paths, as a result of dither bias.

FIGS. 18A and 18B illustrate dither bias and its correction.

FIGS. 19A and 19B illustrate the relationship between a dithered scene and a moving scene.

FIG. 20 illustrates a dither pattern for non-integer dithering.

FIG. 21 illustrates the values used for calculating offset correction for non-integer dithering.

DETAILED DESCRIPTION OF THE INVENTION

The invention described herein is a method of calculating gain correction values and offset correction values for infrared detector arrays. The array is optically or mechanically dithered so that two or more neighboring detector elements of the array look at the same location of a scene. A dither motion occurs once per field so that each new field contains pixel values for the same location of the scene but viewed by a different detector element. The scene is assumed stable, so that if there were no gain or offset errors, a pixel value would be the same in both fields even though it was sensed by different detector elements. Then, the fields of pixel data are processed to calculate a gain correction value and an offset correction value for each detector element. The original fields of pixel data are corrected by multiplying each detector element's response by its gain correction and by subtracting its offset correction.

As explained below, for each detector element, the gain and offset errors are calculated from local averages. The local average for a particular detector element includes a term for that detector element as well as terms for its neighboring detector elements. For offset correction, local averages are calculated for "opposing" sets of neighboring detector elements. Gain and offset errors are "smoothed" in successive iterations of the method, making the method equivalent to low pass filtering the errors. More specifically, the gain and the offset of each detector element can be expressed in matrix form as [Gain] and [Offset], respectively. These matrices are shifted, summed, and averaged, in operations that can be represented as convolutions. The convolutions are with "masks" that result in low pass filtered versions of [Gain] and [Offset]. The process is recursive so that after successive iterations, [Gain] and [Offset] become constant.

The following description includes embodiments of the method for one-dimensional and two-dimensional arrays. In the one-dimensional method, the dither is in one direction. In the two-dimensional method, the dither is in two directions. For both methods, the embodiments described herein compute local averages with values from "near neighbor" detector elements, resulting in a filter domain of a certain size. In other embodiments, local averages could be computed with a larger "neighborhood", with computations modified accordingly, to provide a larger filter domain.

System Overview

Figure 1A:
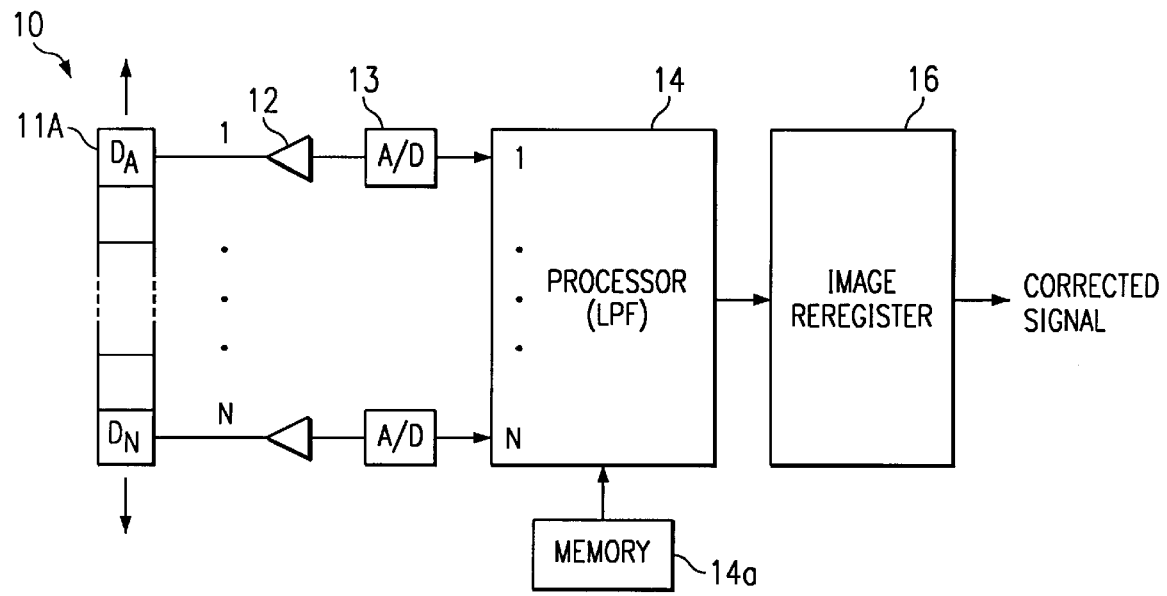
FIGS. 1A and 1B are block diagrams of infrared detector systems in accordance with the invention.

FIG. 1A is a block diagram of a one-dimensional infrared detector system in accordance with the invention. A detector array 11A has a number of individual detector elements $D_{A-N}$. In the embodiment of FIG. 1A, array 11A scans horizontally. However, as explained below, the invention is easily modified for vertical scanning.

Each detector element $D_{A-N}$ of array 11A provides a response signal, indicating flux irradiance, on a separate channel. Each channel has an amplifier 12 and an analog-to-digital converter 13 that samples the signal. The N data signals are delivered in parallel to processor 14. At each time, t, the data received by processor 14 are pixel values representing intensity a given sample time.

It is assumed that the detector elements $D_{A-N}$ of array 11A have non-uniform responses. That is, at least two of the detectors, and probably all of them to one extent or another, do not provide the same response to a given temperature in the scene. The invention is designed to compensate these non uniformities regardless of whether they are linear or non-linear.

As indicated by the arrows in FIG. 1A, a dither motion is achieved by displacing array 11A in the vertical direction. In a simple implementation of the method, the displacement is equal to the height of one detector element D. This can be accomplished with mechanical stepper motors or other opto-mechanical means known in the art. After processing, the image data may be manipulated so that the images register in the same place for display.

Processor 14 may be any device capable of performing the mathematical operations described below. Therefore, processor 14 might be a general purpose processor programmed to perform the appropriate operations with programming stored in a memory 14a. Or processor 14 might be dedicated logic circuitry or of some combination of software and hardware driven devices.

The output of processor 14 is a corrected signal, from which an image can be generated. The embodiments of this description are designed to provide real time correction for displayed images, but the same method could be used for stored image data.

Figure 1B:
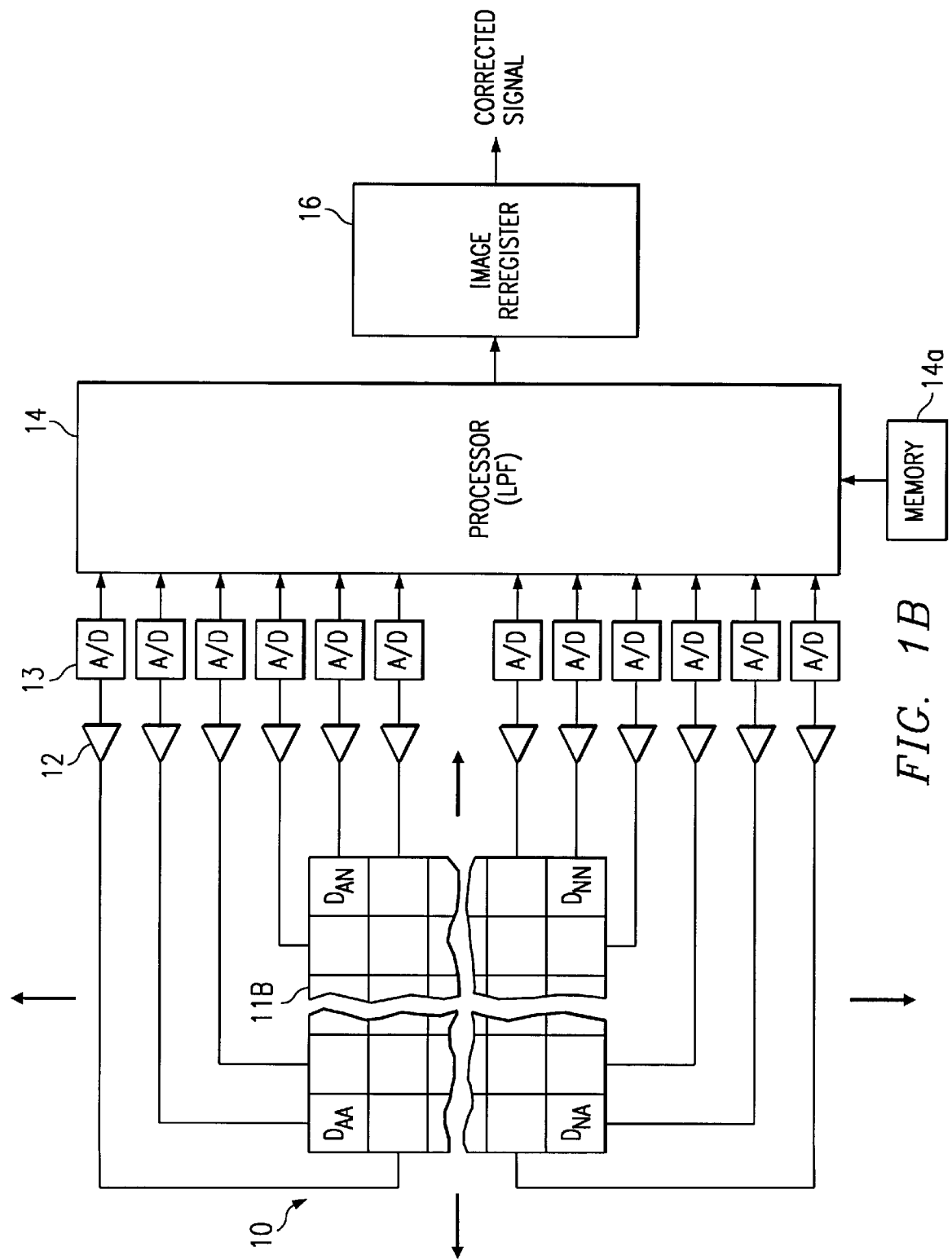

FIG. 1B illustrates the same system as FIG. 1A, but with a two-dimensional array 11B. As explained below, for two dimensional arrays, in the example of this description, the dither is in both the vertical and horizontal direction. The invention can also be modified for a diagonal dither pattern.

Figure 2:
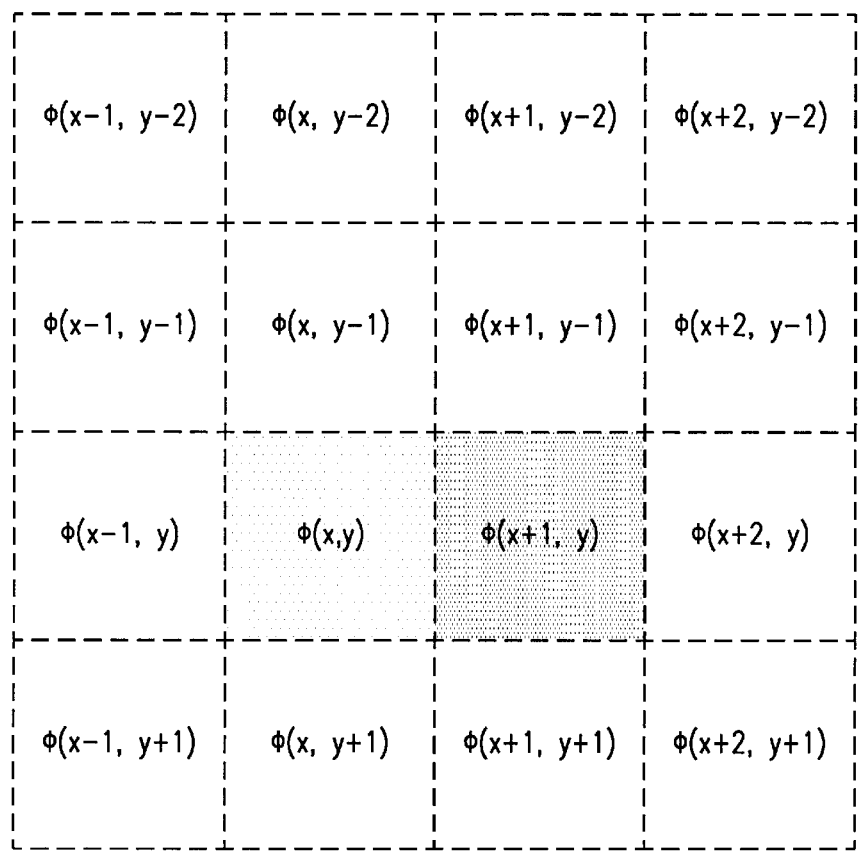
FIG. 2 illustrates a portion of a scene to be viewed by a one dimensional or two dimensional detector array.

FIG. 2 illustrates a portion of a scene to be viewed by a one-dimensional array, such as array 11A, or by a two-dimensional array, such as array 11B. The scene is divided into a number of pixels, each representing an area whose irradiance flux is sensed by a detector element of array 11A or 11B. For simplicity of illustration, only the pixels sensed by a 4×4 portion of detector elements are explicitly illustrated. In practice, a number of pixels corresponding to the scan of array 11A or to the size of array 11B comprises an image "field". The true flux incident upon each pixel, indexed by (x,y) coordinates, is Φ(x,y). The pixel values for two adjacent pixels, at (x,y) and at (x+1,y), are shown as being light grey and dark grey, respectively.

For a two-dimensional array, such as array 11B of FIG. 1B, the desired response of the array to the scene flux of FIG. 2 can be represented as:

$$[Image] = g \cdot [\Phi] + o$$

where [Image] is a two-dimensional matrix of the response value of each detector element D and [Φ] is a two-dimensional matrix of values representing the actual scene flux at the location viewed by each detector element D. Each value in [101] corresponds to one pixel location in the scene space. In this ideal response, gain and offset are global values, g and o.

An image corrupted only by fixed pattern noise can be represented as:

$$[Image] = [Gain] \cdot [\Phi] + [Offset]$$

where [Gain] is a two-dimensional matrix that contains the gain values for each detector element D, and [Offset] is a two-dimensional matrix that contains the offset values for each detector element D. Each value in [Gain] is comprised of the global gain, g, plus the detector element's gain error. Each value in [Offset] is comprised of the global offset, o, plus the detector element's offset error.

The dithering technique described below uses dithering and local neighbor averaging to smooth the high frequency components of the [Gain] and [Offset] matrices. The gain correction is achieved by multiplying a gain correction term to equalize the response gain ratios between neighboring detector elements. Offset correction is achieved by subtracting an offset correction term to reduce the difference between individual detector element responses and the local average responses. After gain and offset correction, the image could be represented as:

$$[Corrected\ Image] = [Image] \cdot [Gain\ Correction] - [Offset\ Correction]$$
$$= [Smoothed\ Gain] \cdot [\Phi] + [Smoothed\ Offset].$$

As explained below, the gain and offset correction process recursively corrects the images to achieve smoother and smoother gains and offsets until the following result is achieved:

[Smoothed Gain]≈g=constant ,and

[Smoothed Offset]≈o=constant

For a one-dimensional array, such as array 11A of FIG. 1A, the above matrices would be replaced by column vectors.

Non Uniformity Compensation for One-Dimensional Arrays

Figure 3A:
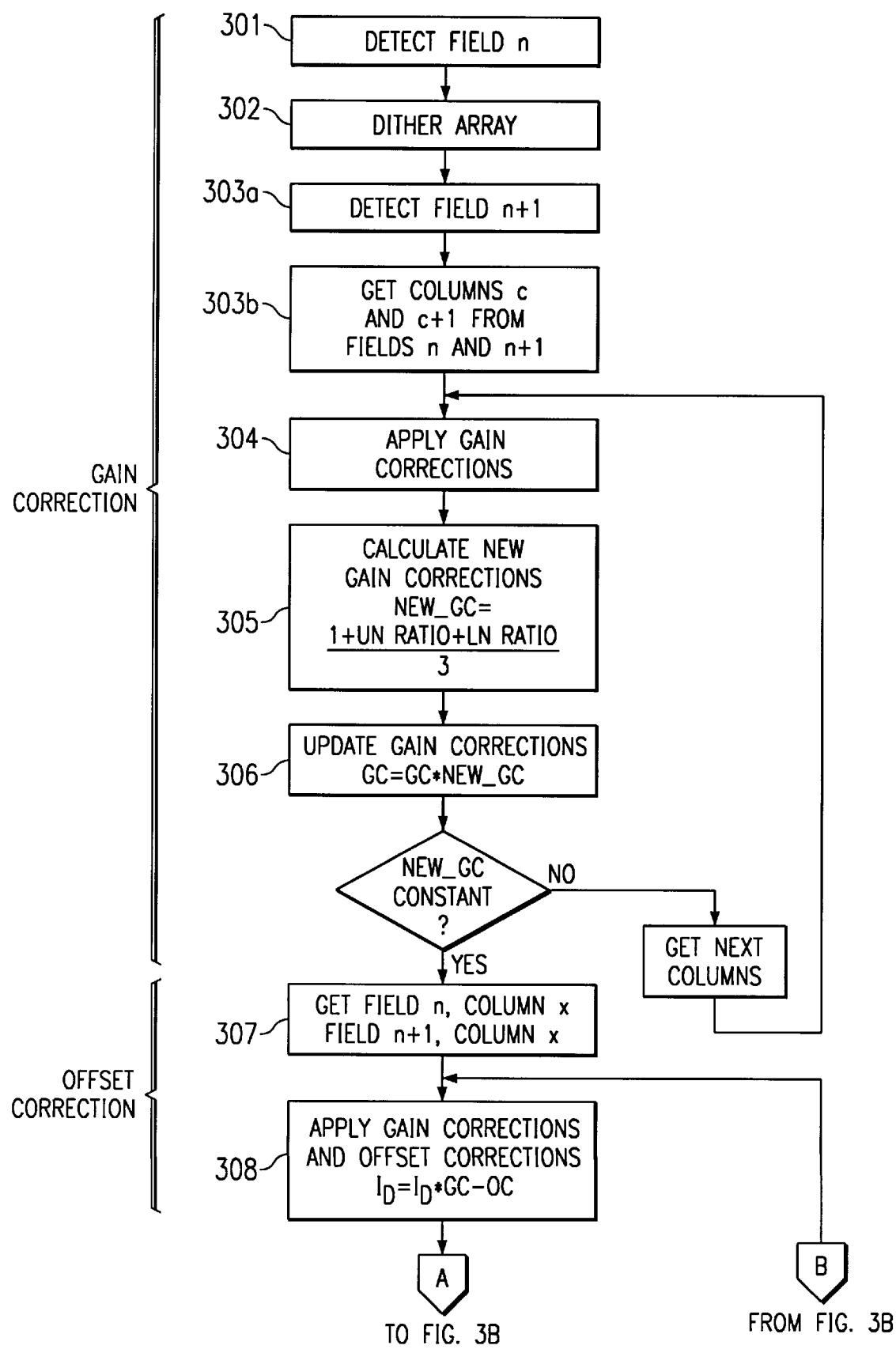
FIGS. 3A and 3B illustrate the basic steps of the method of the invention, as applied to a one-dimensional array.
Figure 3B:
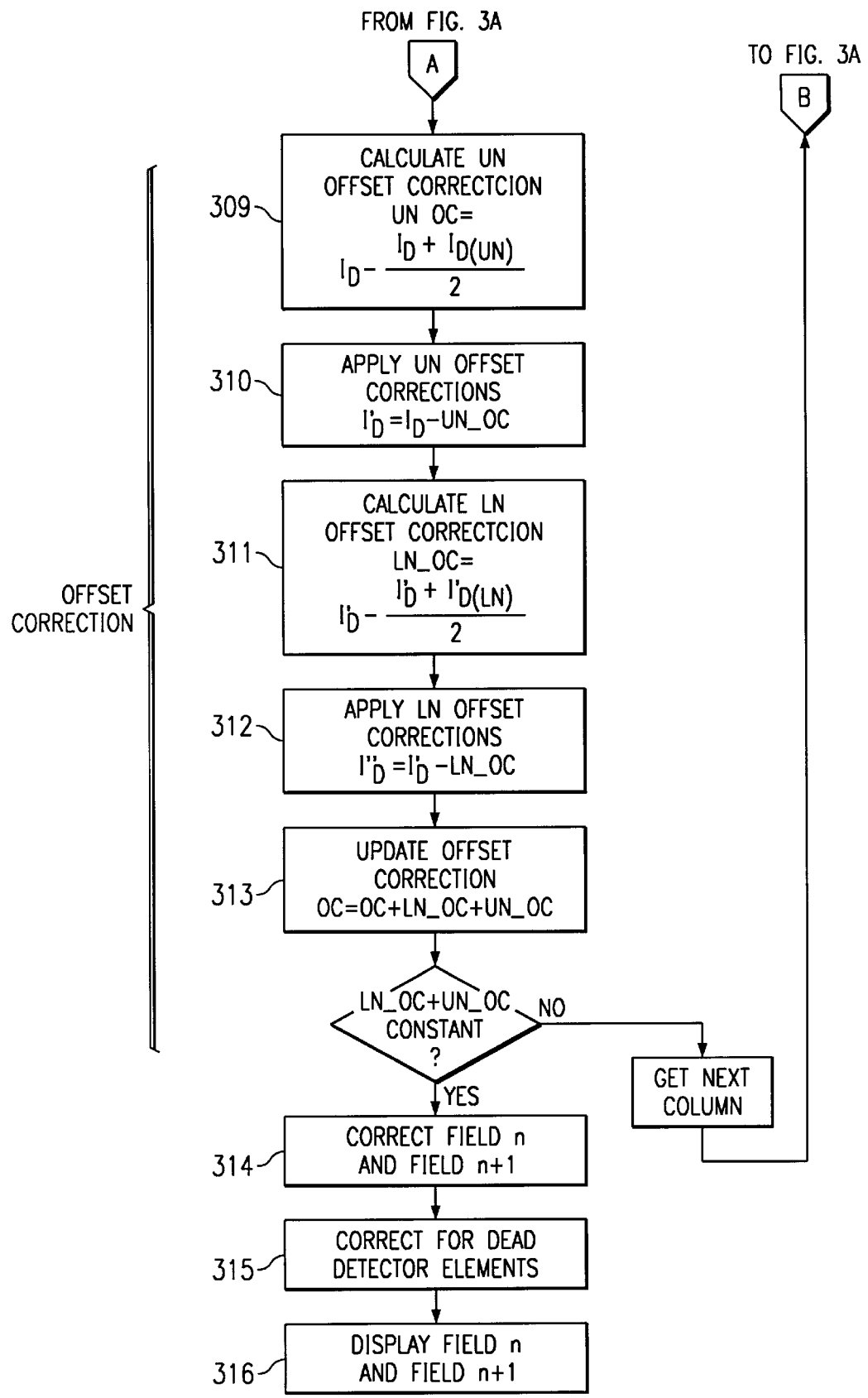

FIGS. 3A and 3B illustrates the basic steps of the non uniformity compensation method, as applied to a one-dimensional array. The embodiment of FIGS. 3A and 3B is for a horizontally scanning array, such as array 11A of FIG. 1A, most of whose detector elements have an "upper" and a "lower" neighboring detector element. The exceptions are the "end" detector elements, for which calculations are modified. The embodiment of FIGS. 3A and 3B could be adapted for a vertically scanning array, whose detector elements would have a "left" and a "right" neighboring detector element. In the case of either a horizontally or vertically scanning array, the method involves two "near neighbors" of each detector element that is not an end detector element, regardless of whether these near neighbors are "left and right" or "upper and lower" neighbors.

In the embodiment of FIGS. 3A and 3B, a horizontally scanning array, such as array 11A receives data column-by-column. Both gain and offset corrections are also performed column-by-column, consistent with real time data acquisition and processing. Gain correction calculations are performed with data from two adjacent columns of two consecutive fields. Offset correction calculations are performed with data from the same column from two consecutive fields. For a vertically scanning array, the processing would be equivalently performed on horizontal "rows" of data from left and right neighbors.

The calculation of gain and offset correction values is not necessarily synchronous with display of the image. In the example of FIGS. 3A and 3B, the iterations for gain correction values are repeated until they are constant, then the iterations for offset correction values are repeated until they are constant, before the image is corrected and displayed. Thus, pixel data is received and stored and the method of FIGS. 3A and 32 is performed, before the data is corrected for display. Alternatively, uncorrected data and partially corrected data may be displayed as the iterations of FIGS. 3A and 3B are being performed. Also, the data may be output for further processing or storage in memory. The decision of when to use the correction values to generate a display is a matter of time or memory constraints, or of the overall system configuration.

Steps 301–306 are the gain correction part of the method. A gain correction value for each detector element is calculated before the offset correction values. This is because the offset errors do not affect the gain calculation.

Step 301 is receiving the data for a first field. A field is a set of data, acquired during a complete horizontal scan of array 11. Thus, one field contains the pixel values representing a complete scene.

FIG. 4A illustrates Step 301 in simplified form, using a horizontally scanning array 41 and scene 42. For simplicity of explanation, array 41 has only three detector elements, $D_{A-C}$, and scene 42 has only 4×4 locations to be represented as pixel values. Each location of scene 42 has a "true" flux value, ranging from 1 to 16. The gains of the three detector elements, $D_A$, $D_B$, and $D_C$, are 1, 2, and 3, respectively. As array 41 scans the first field (i.e., Field 1), it provides pixel values, column-by-column. With the detector element gains, the received pixel values (detector outputs) of Field 1 are:

$$Field\ 1 = \begin{matrix} 2 & 4 & 6 & 8 \\ 6 & 12 & 18 & 24 \\ 12 & 24 & 36 & 48 \end{matrix}.$$

As explained below, the detector outputs may also have offset errors, which, for simplicity of explanation, are not included in the above values.

Step 302 is dithering array 41. The distance of the dither is the height of one detector element. For a horizontally scanned array, such as array 11, the dither is in the vertical direction. For a vertically scanned array, the dither would be in the horizontal direction. In either case, in this example, the dither is a distance substantially the same as the dimension of one detector element in the cross direction of the scan.

FIG. 4B illustrates Step 302. The scene is assumed to be substantially stable during the dither, so the scene is illustrated as having the same flux values before and after the dither. As a result of the dither, pairs of neighboring detector elements are exposed to the same scene path during the dither cycle. For example, both $D_A$ and $D_B$ receive the scene flux from the second row of scene 42.

In a modified version of the method, Step 302 could be performed with fractional dithering, to enhance image resolution. For example, the dither could be ½ the pixel height. The new pixel values would then be extrapolated to estimate pixel values that would occur with a full dither. These extrapolated pixel values would then be used for calculating correction values. In another modified version, the dither could be for a distance equal to the pixel dimension plus a fraction. It is also possible to dither in distances of two or more pixel dimensions with calculations modified accordingly.

Step 303*a* is receiving a second field, here Field 2, with array 41 in its new position as illustrated in FIG. 4B. With the detector element gains, the received pixel values for Field 2 are:

$$\text{Field 2} = \begin{matrix} 1 & 2 & 3 & 4 \\ 4 & 8 & 12 & 16 \\ 9 & 18 & 27 & 36 \end{matrix}.$$

Like the values of Field 1, these values do not include offset errors.

Step 303*b* is retrieving two adjacent columns of data from each field. As an alternative to Steps 303*a* and 303*b*, the process could be performed "on the fly" with pairs of columns of data being processed from Field 2 as the field is being scanned. Also, the columns whose data is being used for calculations could be spaced rather than adjacent.

Step 304 is applying the gain correction values from the previous iteration, if any, to the data for the two columns of the new field (Field 2) and the corresponding data in the previous field (Field 1). By "corresponding" is meant the pixel values in the same two columns. In the first iteration, there are no previously calculated correction values, but in subsequent iterations, each value will be multiplied by an associated gain correction value. By "associated" is meant that the pixel value is corrected with a correction value of the detector element that sensed that pixel value. After Step 304, the data for the current two columns of both fields is now gain-corrected with current gain correction values, although it may still contain offset errors.

Step 305 is calculating a new gain correction for each detector element. In general terms, this calculation involves a computation of a "gain ratio" for each detector element. Then, for each detector element, the gain ratios of that detector element and of its two neighbors are averaged.

In mathematical terms, Step 305 is performed by computing, for each detector element, a gain correction value from its UN (upper neighbor) gain ratio and its LN (lower neighbor) gain ratio. The general form of the gain correction (GC) computation is:

$$NEW\_GC = \frac{(1 + UN \text{ gain ratio} + LN \text{ gain ratio})}{3}.$$

This calculation is an average of contributing gain ratios. The detector element whose gain correction value is being calculated contributes a term, as do its two near neighbors. The unity term is equivalent to a gain ratio of 1/1, so that the detector element's own gain is used to determine the average. The quotient, 3, is the number of contributing detector elements (the detector element under consideration and its upper and lower neighbors).

Using the data of FIGS. 4A and 4B as a specific example, to begin Step 305, differencing the received pixel values in the first two columns of Field 1 generates the following data:

$$\text{Col 2} - \text{Col 1} = \Delta 1 = \begin{matrix} 2 \\ 6 \\ 12 \end{matrix}$$

Differencing the received pixel values in the first two columns of Field 2 generates the following data:

$$\text{Col 2} - \text{Col 1} = \Delta 2 = \begin{matrix} 1 \\ 4 \\ 9 \end{matrix}.$$

Each difference value is "associated" with a detector element, in the sense that the same detector element detected the two pixel values, from which the difference value was calculated.

The difference values from Fields 1 and 2 are used to obtain gain ratios. These ratios compare difference values of neighboring detector elements. For each detector element, an upper neighbor (UN) gain ratio and a lower neighbor (LN) gain ratio are computed. The following table illustrates how these gain ratios are calculated:

| Δ1 | Δ2 | Δ1/Δ2 | Δ2/Δ1 |
|----|----|-------|-------|
|    | 1  | —     |       |
| 2  | 4  | 2/4   | 4/2   |
| 6  | 9  | 6/9   | 9/6   |
| 12 |    |       | —     |

Each Δ1/Δ2 value is a UN gain ratio—the difference value associated with a detector element's UN divided by the difference value associated with that detector element. Each Δ2/Δ1 value is a LN gain ratio—the difference value associated with a detector element's lower neighbor divided by the difference value associated with that detector element.

As an example of calculating these ratios, in Field 2, $D_B$ sensed pixel values with a difference value of 4. In Field 1, $D_B$'s upper neighbor, $D_A$, sensed pixel values in the same locations but with a difference value of 2. Thus, the UN gain ratio for $D_B$ is 2/4.

As indicated, because $D_A$ has no upper neighbor, no UN gain ratio is available for $D_A$. Also, because $D_C$ has no lower neighbor, $D_C$ has no LN gain ratio.

As an example, for detector element $D_B$, the gain correction is calculated as:

$$GC_B = \frac{(1 + 2/4 + 9/6)}{3}$$
$$= 1,$$

where 2/4 is $D_B$'s UN gain ratio and 9/6 is $D_B$'s LN gain ratio.

If a detector element is an "end" detector element, it has either no UN or no LN. In this case, when calculating the gain correction value, there are only two contributing detector elements. For example, for the "end" detector element, $D_A$, which has no upper neighbor, the gain correction is calculated as:

$$GC_A = \frac{(1 + 4/2)}{2}$$
$$= 1.5,$$

where 4/2 is $D_A$'S LN gain ratio. Likewise, for the other end detector element, $D_C$, which has no lower neighbor, the gain correction is calculated as:

$$GC_C = \frac{(1 + 6/9)}{2}$$
$$= .833,$$

where 6/9 is $D_C$'s UN gain ratio.

The following table sets out the gain correction values obtained as a result of Step 305, based on the first two columns of Fields 1 and 2. Each detector element has an associated gain correction value. In the next iteration of Step 304, these values will be used to correct the next column of data.

$GC_A$=1.5
$GC_B$=1
$GC_C$=0.833

In step 306, the gain correction values are updated. This is accomplished by multiplying the old gain correction values GC (i.e. those updated from the previous iteration) and the gain correction values NEW_GC computed in Step 305.

Steps 303b through 306 are repeated for successive pairs of columns of data across the detector array. As stated above, the column pairs can be adjacent to each other or spaced. The next iteration can re-use one column or use two new columns. The iterations are repeated until the calculated gain correction values become substantially constant.

Steps 307–316 are the offset correction part of the non-uniformity compensation method. The offset correction is performed in two parts.

It is assumed that data for at least two fields is stored in memory as a result of the gain correction calculations. Continuing the example above, data for Field 1 and Field 2 is available. In Step 307, two corresponding columns are retrieved for offset correction calculations.

FIGS. 5A and 5B illustrate the same scene as illustrated in FIGS. 4A and 4B, but with the detector elements having offset errors rather than gain errors. As in FIGS. 4A and 4B, the scene is assumed to be stable, so the flux values are illustrated as being the same from field-to-field. Each detector element is assumed to have an offset error, with detector elements $D_A$, $D_B$, and $D_C$ having offset values of 1, 2, and 3, respectively. Thus, for the first column of Field 1, the received pixel values are:

| 3 |
| 5 |
| 7 | where each value is the sum of the "true" pixel value and the offset error of the detector element that sensed it. For the first column of Field 2, the received pixel values are:

| 2 |
| 4 |
| 6 |

In Step 308, the updated gain correction values from is Step 306 and the updated offset correction values calculated in the previous iteration, if any, are applied to the pixel values for the new column in both the new field and the previous field. In the first iteration of Step 308, there are no previously computed offset corrections. In the next iteration of Step 308, previously computed offset correction values will be available, and will be used to correct the new column of data in both Field 1 and Field 2.

In Step 309, offset correction values for each detector element are calculated, using the difference of the output of that detector element and of its upper neighbor. These offset correction values are referred to herein as "upper neighbor offset correction values". This calculation first determines, for each detector element, the difference between the output of a detector element and the output of the detector element's upper neighbor, at the same location of the scene. Using the received values set out above, and assuming the gain correction from Step 308, the UN difference values are:

$$- = -$$
$$4 - 3 = 1$$
$$6 - 5 = 1.$$

As indicated, detector element $D_A$ has no upper neighbor and thus has no UN difference value. Next, for each detector element, its difference value is divided by 2 (the number of contributing detector elements). Expressed in mathematical form, each upper neighbor (UN) offset correction (OC) value is calculated as:

$$UN\ OC = \frac{UN\ \text{difference}}{2}.$$

The above offset correction value could be equivalently expressed as a detector element's local average output, subtracted from that detector element's output. For example, for $D_B$:

$$OC_B = I_B - \frac{1}{2}(I_B + I_A)$$
$$= \frac{1}{2}(I_B - I_A),$$

where I represents a detector element's output.

For the first iteration, the UN offset correction values are:

| $OC_A$ = — |
| $OC_B$ = ½ = 0.5 |
| $OC_C$ = ½ = 0.5 |

In Step 310, the UN offset correction values calculated in Step 309 are applied to the output values for the current column in both the new field and the previous field. Thus, for Field 1 (the previous field), the corrected outputs are:

$$3 - 0 = 3$$
$$5 - 0.5 = 4.5$$
$$7 - 0.5 = 6.5$$

and for Field 2 (the new field), the corrected outputs are:

$$2 - 0 = 2$$
$$4 \triangle 0.5 = 3.5$$
$$6 - 0.5 = 5.5$$

In Step 311, an offset correction value for each detector element is calculated from the corrected data of Step 310, using the difference of the output of that detector element and its lower neighbor. These offset correction values are referred to herein as "lower neighbor offset correction values". The upper and lower neighbors are referred to herein as "opposing" neighbors.

The lower neighbor offset correction calculation determines, for each detector element, the difference between the corrected output of a detector element and the corrected output of that detector element's lower neighbor, at the same scene location. The resulting difference values are:

$$3 - 3.5 = -0.5$$
$$4.5 - 5.5 = -1$$
$$- = -$$

As indicated, detector element $D_C$ has no lower neighbor and thus has no LN difference value. Next, for each detector element, its difference value is divided by 2 (the number of contributing detector elements). Expressed in mathematical form, each lower neighbor (LN) offset correction (OC) value is calculated as:

$$LN\ OC = \frac{LN\ \text{difference}}{2}.$$

Like the UN offset correction value calculation, the above LN offset correction value calculation can be equivalently expressed as the local average of a detector element and its lower neighbor, subtracted from that detector element's output. For example, for $D_B$:

$$OC_B = I_B - \frac{1}{2}(I_B + I_C)$$
$$= \frac{1}{2}(I_B - I_C),$$

where I represents a detector element's output.
Thus, the LN offset correction values are:

$$OC_A = -(0.5)/2\ \ = -0.25$$
$$OC_B = -\frac{1}{2}\ \ \ \ \ \ \ \ \ \ = -0.5$$
$$OC_C = -$$

In Step 312, these offset correction values are applied to the current column of data in both the previous field and the current field.

In Step 313, the offset correction values are updated by adding to the old offset correction (i.e., that of the previous iteration) the UN offset correction value calculated in Step 309 and the LN offset correction value calculated in Step 311.

Steps 307–313 are repeated, column by column, until the offset correction values are substantially constant. The successive columns can be adjacent or spaced.

In Step 314, the gain and offset correction values are now used to correct the data in Field n and Field n+1 for display.

Step 315 is correcting for "dead" detector elements, which are those that do not detect a signal or can otherwise be known to be defective. A pixel value sensed by another detector element in an adjacent field can be substituted for the pixel value that should have been detected by the dead detector element. For example, if $D_A$ were dead, the pixel value detected by its lower neighbor $D_B$ in Field 2 can be substituted for the same pixel in Field 1.

The data for the current column has now been both gain corrected and offset corrected and is now ready for display. In Step 316, Fields n and n+1 are displayed.

Non Uniformity Compensation for Two-Dimensional Arrays

The dithered scan method of non uniformity compensation can be used with two-dimensional arrays, as well as one-dimensional arrays. In the case of a two-dimensional array, most of its detector elements have adjoining (i.e. "near") neighbors on all four sides. The exceptions are the detector elements on the first and last columns and the first and last rows. These "end" detector elements have only three neighbors, and in the case of corner detector elements, they have only two neighbors. Also, each detector element has other detector elements that touch at its corners and that can also be considered neighbors. As explained below, for a two-dimensional array, gain correction calculations use local averages of gain ratios of each detector element and its four adjoining neighbors, whereas offset correction calculations use local averages of outputs of each detector element and of its four adjoining neighbors and of two of its corner neighbors.

Figure 6A:
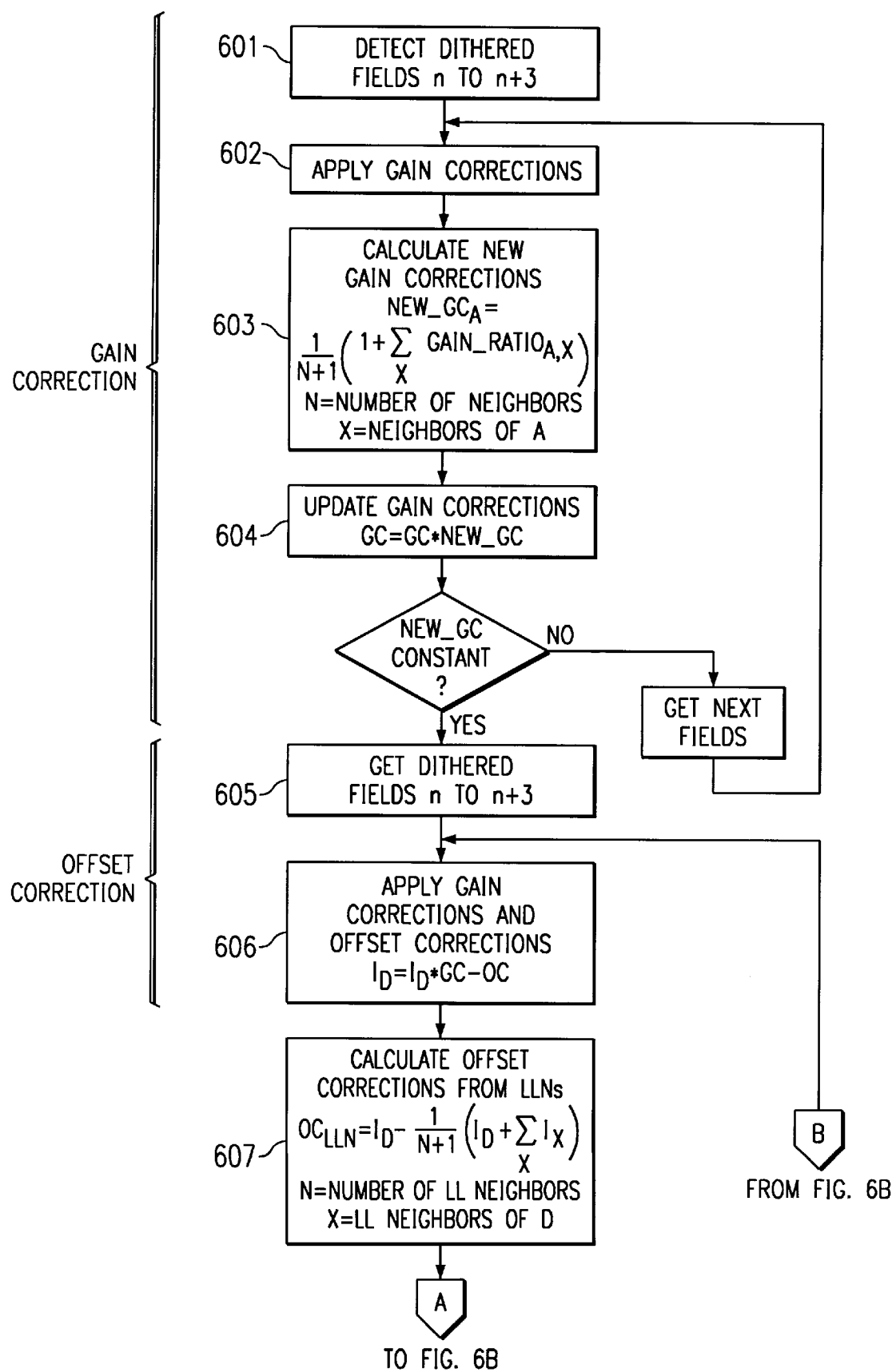
FIGS. 6A and 6B illustrate the basic steps of the method of the invention, as applied to a two-dimensional array.
Figure 6B:
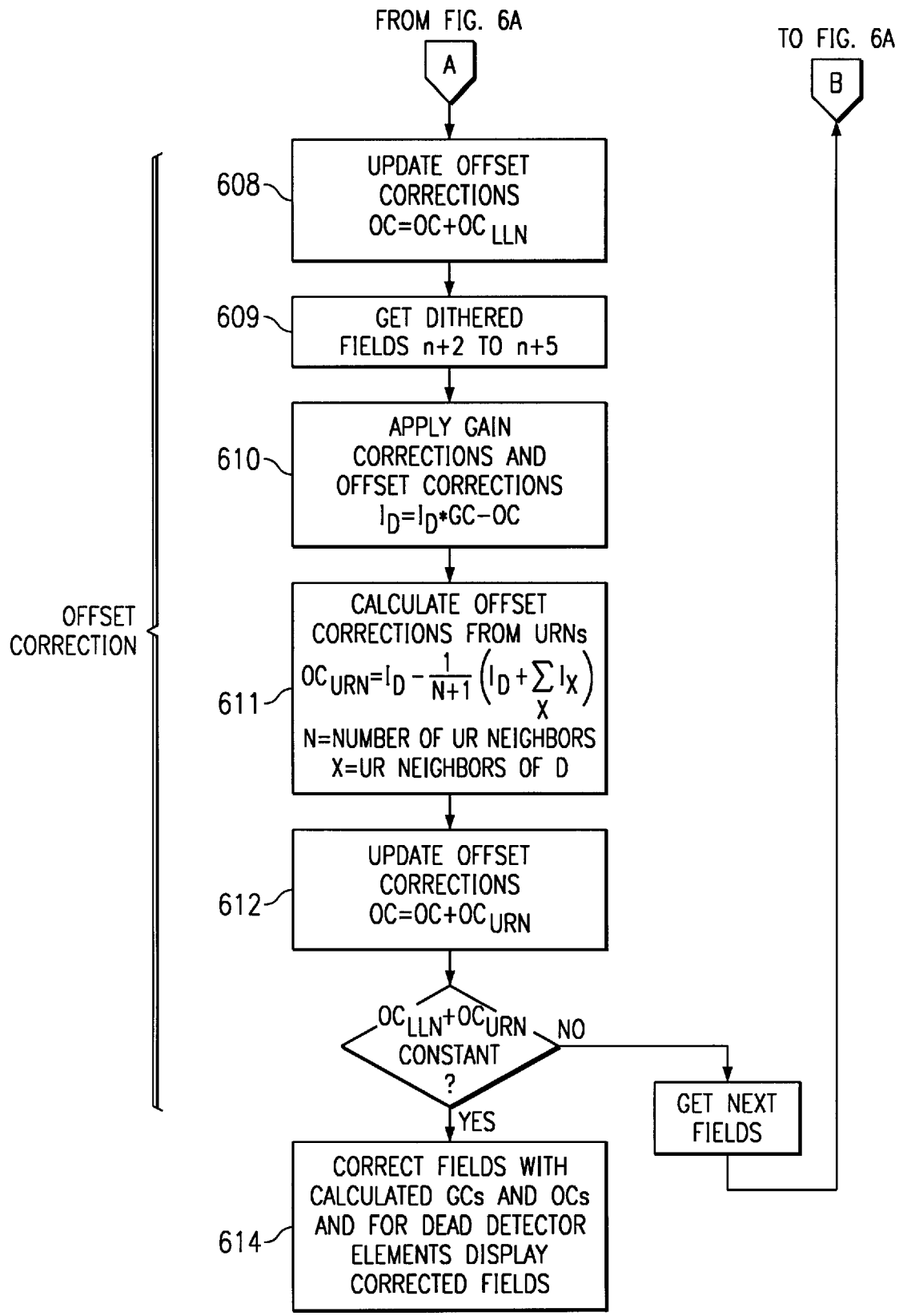

FIGS. 6A and 6B illustrate the basic steps of the method, as applied to a two-dimensional array. As indicated below, both gain correction and offset correction require data from a number of time-contiguous fields. Gain correction uses data from four fields and offset correction uses data from six fields. However, the dither pattern is the same so that gain correction and offset correction may use the same input data.

Steps 601–604 are the gain correction part of the method. Step 601 is receiving four dithered fields of pixel values. The dither pattern is box-shaped, so that each detector element views four scene locations during a dither cycle. At the end of the cycle, the array is in its original position. Each dither is assumed to be the height or width of one detector element, but as discussed above in connection with FIG. 3, fractional dithering could be used to enhance resolution. Also, the dither could be for a distance of more than one pixel dimension or of fractional parts thereof. The dither could also be diagonal, with the selection of neighbors modified accordingly.

FIG. 7 illustrates the dithering motion of Step 601. Four positions of a single detector element, $D_A$, are shown, one position for each of four fields. The four fields are identified as Fields$_{1-4}$. At each dither position, a new pixel value is acquired representing the flux intensity as sensed by $D_A$. During the four field times, each detector element of the array undergoes a similar dither pattern, and acquires a pixel value from a different location. Thus, after one dither cycle, four fields of pixel data have been acquired. As with the one-dimensional array, the dither causes neighboring detector elements to be exposed to the same scene path.

Step 602 is correcting the pixel values for the four fields with gain correction values calculated in the previous iteration. In the first iteration, there are no previously calculated values, and the initial gain correction value is 1.

Step 603 is calculating a new gain correction for each detector element. In general, this calculation first involves a computation of a gain ratio for each detector element. Then, for each detector element, the gain ratios of that detector element and of its four neighbors are averaged.

FIG. 8 illustrates $D_A$ with its four neighbors, $D_B$, $D_C$, $D_D$, and $D_E$, during each of the four fields of FIG. 7. As stated above, it is assumed that the flux is stable during the four-field dither cycle. In Field$_1$, $D_A$ detects the flux value, $\Phi(x,y)$. In Field$_2$, $D_A$ has moved one space to the right and detects the flux value $\Phi(x+1, y)$. In Field$_3$, $D_B$ is now in position to detect the flux value $\Phi(x+1,y)$. Finally, in Field$_4$, $D_B$ detects the flux value $\Phi(x,y)$.

The following table sets out the responses of FIG. 8, where G is the gain and O is the offset for a detector element:

| Field | $D_A$ | $D_B$ |
|---|---|---|
| 1 | $G_A \cdot \phi(x,y) + O_A$ | |
| 2 | $G_A \cdot \phi(x + 1, y) + O_A$ | |
| 3 | | $G_B \cdot \phi(x + 1, y) + O_B$ |
| 4 | | $G_B \cdot \phi(x,y) + O_B$ |

For each detector element, the difference between two adjacent flux values detected by that detector element is calculated. For $D_A$, the difference value is:

$$\Delta_A = (G_A \cdot \Phi(x,y) + O_A) - (G_A \cdot \Phi(x+1, y) + O_A)$$

and for $D_B$, the difference value is:

$$\Delta_B = (G_B \cdot \Phi(x+1,y) + O_B) - (G_B \cdot \Phi(x,y) + O_B)$$

The gain ratio between detector elements $D_A$ and $D_E$ is:

$$\text{gain ratio}_{A,B} = \frac{\Delta_B}{\Delta_A}$$
$$= \frac{(G_B \cdot \Phi(x+1, y) + O_B) - (G_B \cdot \Phi(x, y) + O_B)}{(G_A \cdot \Phi(x, y) + O_A) - (G_A \cdot \Phi(x+1, y) + O_A)}$$
$$= -\frac{G_B}{G_A}.$$

Similar gain ratios can be calculated for any pair of neighboring detector elements.

The gain correction for $D_A$ is derived from the gain ratios of $D_A$ and of its four neighbors. In mathematical terms, the gain correction for $D_A$ is described by:

$$GC_A = \frac{1}{5}\left(1 - \sum_{X=B,C,D,E} \text{gain ratio}_{A,X}\right)$$
$$= \frac{1}{5}\left(1 - \frac{\Delta_B}{\Delta_A} - \frac{\Delta_C}{\Delta_A} - \frac{\Delta_D}{\Delta_A} - \frac{\Delta_E}{\Delta_A}\right)$$
$$= \frac{1}{5}\left(1 + \frac{G_B}{G_A} + \frac{G_C}{G_A} + \frac{G_D}{G_A} + \frac{G_E}{G_A}\right)$$

$$= \frac{\frac{1}{5}\sum_{X=A,B,C,D,E} \text{Gain}_X}{\text{Gain}_A}.$$

Similar calculations can be made to obtain a gain correction value for each detector element.

Step 604 is updating the gain correction values by multiplying the newly calculated gain correction values and the old gain correction values. If each detector element's output were multiplied by its gain correction, the result would be a corrected output value. For example, after Step 604, $D_A$'s pixel value is:

$$\text{Corrected } I_A = GC_A(\text{Gain}_A \cdot \Phi + \text{Offset}_A)$$
$$= \frac{1}{5}\left(\sum_{X=A,B,C,D,E} \text{Gain}_X\right) \cdot \Phi + GC_A \cdot \text{Offset}_A$$
$$= \text{Residual Gain}_A \cdot \Phi + \text{New Offset}_A$$

Using matrix notation, the gain correction calculations can be described in terms of the entire array. The scene flux collected by the array during a four-field dither cycle can be depicted as $[\Phi]$, $[\Phi]\rightarrow$, $[\Phi]\downarrow$, and $[\Phi]\uparrow$, where each arrow indicates the scene location relative to the initial location. The responses of the detector elements during the dither cycle are represented by four image matrices: $[I_{Field1}]$, $[I_{Field2}]$, $[I_{Field3}]$, and $[I_{Field4}]$. Thus:

$$[I_{Field\,1}] = [\text{Gain}] \cdot [\Phi] + [\text{Offset}]$$
$$[I_{Field\,2}] = [\text{Gain}] \cdot [\Phi] \rightarrow + [\text{Offset}]$$
$$[I_{Field\,3}] = [\text{Gain}] \cdot [\Phi] \downarrow + [\text{Offset}]$$
$$[I_{Field\,4}] = [\text{Gain}] \cdot [\Phi] \uparrow + [\text{Offset}].$$

The difference values for Fields 1 and 2 are calculated as:

$$[I_{Field\,1}] - [I_{Field\,2}] = [\text{Gain}] \cdot ([\Phi] - [\Phi] \rightarrow)$$

and the shifted image difference values for Fields 3 and 4 are:

$$([I_{Field\,4}] - [I_{Field\,3}])\downarrow = ([\text{Gain}] \cdot ([\Phi]\uparrow - [\Phi]\downarrow))\downarrow,$$

which is equivalent to:

$$[I_{Field\,4}]\downarrow - [I_{Field\,3}]\downarrow = [\text{Gain}]\downarrow \cdot ([\Phi] - [\Phi]\rightarrow)$$

This operation is the same as that used to obtain $\Delta_A$ and $\Delta_B$, as described above for detector elements $D_A$ and $D_B$.

From the above difference and shifted difference equations, the gain ratios between neighboring detector elements can be calculated as:

$$\frac{[I_{Field\,4}]\downarrow - [I_{Field\,3}]\downarrow}{[I_{Field\,1}] - [I_{Field\,2}]} = \frac{[\text{Gain}]\downarrow}{[\text{Gain}]},$$

which is the same calculation described above for obtaining gain ratio$_{A,B}$.

The gain ratios for other pairs of detector elements are:

$$\frac{[I_{Field\,1}] \rightarrow -[I_{Field\,4}] \rightarrow}{[I_{Field\,2}] - [I_{Field\,3}]} = \frac{[Gain] \rightarrow}{[Gain]}$$

$$\frac{[I_{Field\,2}] \uparrow -[I_{Field\,1}] \uparrow}{[I_{Field\,3}] - [I_{Field\,4}]} = \frac{[Gain] \uparrow}{[Gain]}$$

$$\frac{[I_{Field\,3}] \leftarrow -[I_{Field\,2}] \leftarrow}{[I_{Field\,4}] - [I_{Field\,1}]} = \frac{[Gain] \leftarrow}{[Gain]}$$

The gain correction may be defined as the averaged sum of the gain ratios:

$$GC = \frac{1}{5}\left(1 + \frac{[Gain]\downarrow}{[Gain]} + \frac{[Gain]\rightarrow}{[Gain]} + \frac{[Gain]\uparrow}{[Gain]} + \frac{[Gain]\leftarrow}{[Gain]}\right)$$

$$= \left(\frac{1}{5}\begin{bmatrix} 0 & 1 & 0 \\ 1 & 1 & 1 \\ 0 & 1 & 0 \end{bmatrix} * [Gain]\right) \cdot \frac{1}{[Gain]},$$

The convolution operation on the [Gain] matrix (in braces) represents the shifted, summed, and averaged [Gain] matrix. The operation of convolution with the diamond-shaped mask results in a spatially smoothed (two-dimensionally filtered) version of the [Gain] matrix.

For end detector elements, including those at the corners, the calculations are modified. In a manner analogous to calculating gain corrections for the end detector elements of a one-dimensional array, only the values of available neighbors are part of the local average.

Steps 601–604 are repeated, using successive sets of four fields of data, until the gain correction values become substantially constant.

Referring again to FIGS. 6A and 6B, after the gain correction values are calculated, Steps 605–612 are performed for offset correction values. The same dither pattern is used for offset correction as for gain correction. However, for each detector element, two additional neighbors are used, as compared to those used for gain correction.

FIG. 9 illustrates the neighbor detector elements used to estimate the offset correction for $D_A$. As indicated, $D_A$ has three lower left neighbors (LLNs), which are $D_B$, $D_C$, and $D_D$, and three upper right neighbors (URNs), which are $D_E$, $D_F$, and $D_G$. Although the following description is in terms of these sets of neighboring detector elements, it should be understood that the method could be modified so as to use upperleft neighbors and lower right neighbors. In both cases, the two sets of neighboring detector elements are in opposing corners, and are referred to herein as "opposing" sets of neighbors. Also, the method could be modified so that the two sets of neighboring detector elements are comprised of some number of detector elements other than three.

Referring to FIGS. 6A and 6B and to FIG. 9, offset correction is performed in two parts. First, in Step 605, the offset correction for each detector element is calculated with pixel values from the detector element and its LLNs. This data is in Field$_n$ through Field$_{n+3}$. If these offset correction values were applied, the result would be a residual offset error for each detector element. These residual offset errors are further corrected with pixel values from the detector element and its URNs. This data is in Field$_{n+2}$ through Field$_{n+5}$.

Referring again to FIG. 2 and to FIG. 9, during each four-field dither cycle, a detector element views the same scene location as three of its neighbors. The following table sets out the scene flux incident on $D_A$ and its neighbors during Field$_n$ through Field$_{n+5}$.

| | | | Scene Flux Locations | | | | |
|---|---|---|---|---|---|---|---|
| Field | $D_A$ | $D_B$ | $D_C$ | $D_D$ | $D_E$ | $D_F$ | $D_G$ |
| n | φ(x,y) | φ(x − 1,y) | φ(x − 1, y + 1) | φ(x,y + 1) | | | |
| n + 1 | φ(x + 1,y) | φ(x,y) | φ(x,y + 1) | φ(x + 1, y + 1) | | | |
| n + 2 | φ(x + 1, y − 1) | φ(x,y − 1) | φ(x,y) | φ(x + 1,y) | φ(x + 2, y − 1) | φ(x + 2, y − 2) | φ(x + 1, y − 2) |
| n + 3 | φ(x,y − 1) | φ(x − 1, y − 1) | φ(x − 1,y) | φ(x,y) | φ(x + 1, y − 1) | φ(x + 1, y − 2) | φ(x,y − 2) |
| n + 4 | φ(x,y) | | | | φ(x + 1, y) | φ(x + 1, y − 1) | φ(x,y − 1) |
| n + 5 | φ(x + 1,y) | | | | φ(x + 2, y) | φ(x + 2, y − 1) | φ(x + 1, y − 1) |

During Field$_n$ through Field$_{n+3}$, $D_A$, $D_B$, $D_C$, and $D_D$, successively viewed the same scene flux, Φ(x,y). If the assumption is made that the scene is stable during these fields, and if each detector element had the same offset, the four detector elements would have the same responses. The gain is assumed to have already been corrected to a constant, g, for all detector elements. However, because of the offset errors, there are differences between the detector element responses. These differences are the basis of calculating the offset correction.

In Step 606, the data to he used for offset correction calculations is corrected with the previously calculated gain correction values and with any previously calculated offset correction values.

In Step 607, the offset corrections from the LLNs are calculated. These offset corrections are referred to herein as "LLN offset corrections". For $D_A$, the calculation is as follows:

$$OC_A = I_A(n) - \frac{1}{4}(I_A(n) + I_B(n+1) + I_C(n+2) + I_D(n+3))$$

$$= \frac{3}{4}\left[I_A(n) - \frac{1}{3}(I_B(n+1) + I_C(n+2) + I_D(n+3))\right],$$

where $$I_A(n) = g \cdot \Phi(x,y) + O_A$$

$$I_B(n+1) = g \cdot \Phi(x,y) + O_B$$

$$I_C(n+2) = g \cdot \Phi(x,y) + O_C$$

$$I_D(n+3) = g \cdot \Phi(x,y) + O_D$$

By substitution, $$OC_A = O_A - \frac{1}{4}(O_A + O_B + O_C + O_D)$$

$$= O_A - \frac{1}{4}\sum_{X=A,B,C,D} O_X.$$

The offset correction is updated in Step 608 by adding it to any previously calculated offset correction. As an example of the corrected data at this point, if $D_A$'s response were corrected by subtracting its offset correction, $D_A$'s corrected response would be:

$$\text{Corrected } I_A = g \cdot \Phi(x,y) + O_A - OC_A$$

$$= g \cdot \Phi(x,y) + \frac{1}{4}\sum_{X=A,B,C,D} O_X$$

At this point, $D_A$ has a residual offset, which is the spatial average of offsets from $D_A$ and its LLNs, $D_B$, $D_C$, $D_D$. Similar calculations are made for each detector element.

Using matrix notation, the offset correction can be described in terms of the entire array. At the end of the dither cycle, four image fields are received and are shifted as:

$$[I_{Field\,1}] = g \cdot [\Phi] + [\text{Offset}]$$

$$[I_{Field\,2}] \leftarrow = g \cdot [\Phi] + [\text{Offset}] \leftarrow$$

$$[I_{Field\,3}] \leftarrow \downarrow = g \cdot [\Phi] + [\text{Offset}] \leftarrow \downarrow$$

$$[I_{Field\,4}] \downarrow = g \cdot [\Phi] + [\text{Offset}] \downarrow$$

The LLN offset correction is defined as:

$$OC_{LLN} = [I_{Field1}] - \frac{1}{4} \cdot ([I_{Field1}] + [I_{Field2}] \leftarrow + [I_{Field3}] \leftarrow \downarrow + [I_{Field4}] \downarrow)$$

$$= [\text{Offset}] - \frac{1}{4} \cdot ([\text{Offset}] + [\text{Offset}] \leftarrow + [\text{Offset}] \leftarrow \downarrow + [\text{Offset}]^{\downarrow})$$

$$= [\text{Offset}] - \frac{1}{4} \cdot \begin{bmatrix} 1 & 1 \\ 1 & 1 \end{bmatrix} * [\text{Offset}]$$

When subtracting the offset correction term from the image, the residual offset becomes:

$$\begin{bmatrix} \text{Residual} \\ \text{Offset} \end{bmatrix} = \frac{1}{4}\begin{bmatrix} 1 & 1 \\ 1 & 1 \end{bmatrix} * [\text{Offset}]$$

Mathematically, the smoothing of offset errors is the same as convolving the offset matrix with a rectangular mask. Recursively applying offset corrections to the images is like a low pass filtering process-to the offset noise, which will eventually smooth out the high frequency components of the [Offset] matrix.

In Steps 609–612, $D_A$ is grouped with its URNS, $D_E$, $D_F$, and $D_G$, to calculate its URN offset correction. Referring to the table above, these detector elements receive the scene flux value $\Phi(x+1,y-1)$ in $\text{Field}_{n+2}$ through $\text{Field}_{n+5}$. These are the four fields retrieved in Step 609. The output values in these fields are corrected in Step 610 with current gain and offset correction values. In Step 611, an analogous calculation as described above for LLNs can be used for URNs, where the offset correction for $D_A$ is calculated by averaging the offset error of $D_A$ with those of $D_E$, $D_F$, and $D_G$. The offset correction values are again updated in Step 612.

Steps 605–612 are repeated for every four successive fields, alternating the LLN and URN corrections. The alternating corrections ensure that end detector elements are corrected at least once by at least one neighbor.

For offset errors introduced by dither bias, a weighting factor can be applied to the correction value during the offset correction loops. The weighting factor, $\alpha<1$, is applied such that only fractions of the calculated offset errors are corrected. The combination of a small weighting factor and the alternating neighbor calculations will cancel correction errors introduced by dither bias and/or scene motion.

A variety of dither patterns, single steps of multi-step loops, with either vertical, horizontal, or diagonal steps, can be chosen for offset correction. The common feature of the various dither patterns is that a number of neighboring detector elements are exposed to the same scene flux during a correction cycle. For the rectangular dither pattern described above, corrections can also be calculated with different combinations of neighboring detector elements. For example, fields 1 and 2 (with a single horizontal dither step) could be used to correct offset errors using left neighbors, followed by right neighbors. Then, fields 2 and 3 (with a single vertical dither step) could be used to correct offset errors using down neighbors, followed by up neighbors, etc.

Figure 11:
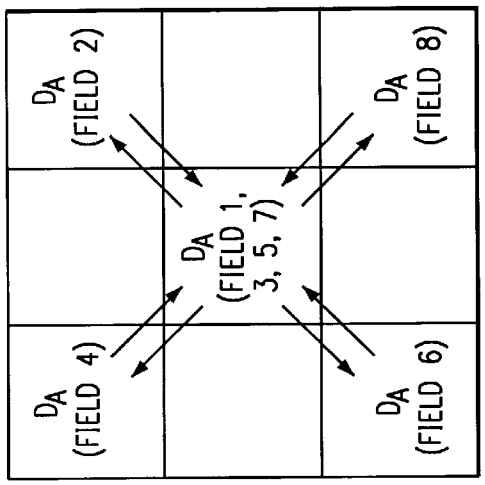
FIGS. 10 and 11 illustrate an alternative dither pattern for offset correction for a two-dimensional array.
Figure 10:
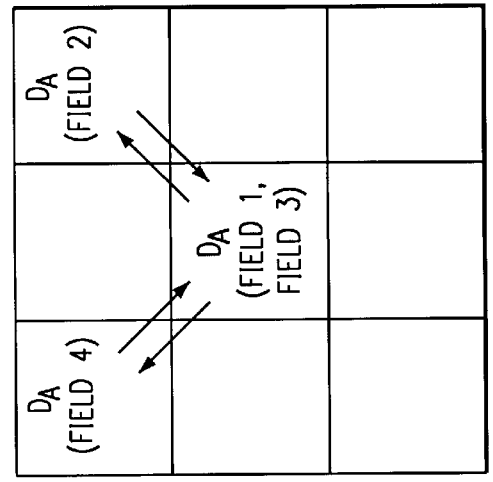

FIGS. 10 and 11 illustrate an alternative dither pattern for offset correction. The pattern is diagonal, and in the example of FIG. 10 is upper right diagonal/return/upper left diagonal/return. FIG. 11 illustrates $D_A$ and its four diagonal neighbors, $D_B$, $D_C$, $D_D$, and $D_E$. During a four-field dither cycle, $D_A$ views three different scene pixels and its four diagonal neighbors also view one or two of the three scene pixels in the same cycle. Local differences are calculated from values of that detector element and its four neighbors to obtain offset corrections.

Figure 13:
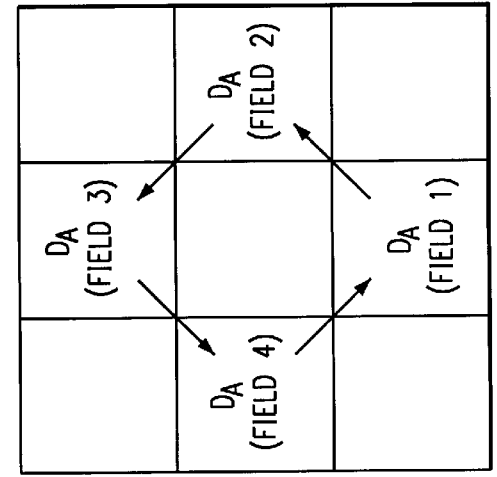

FIGS. 12 and 13 illustrates two other diagonal dither patterns. These patterns may be used for both gain and offset correction.

Figure 15:
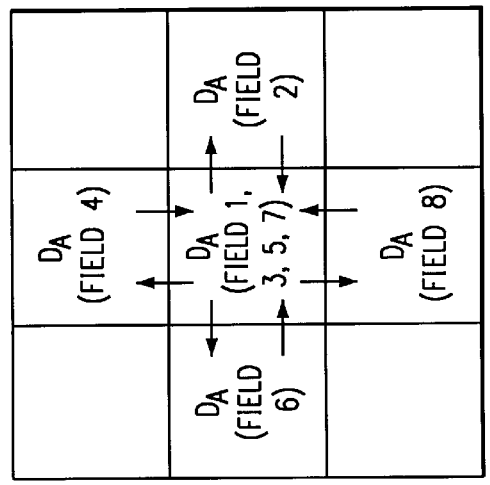
FIG. 15 illustrates an alternative rectangular dither pattern for gain and offset correction for two-dimensional arrays.
Figure 11:
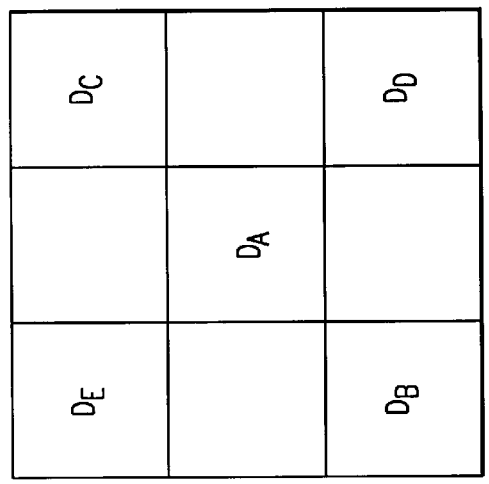
Figure 14:
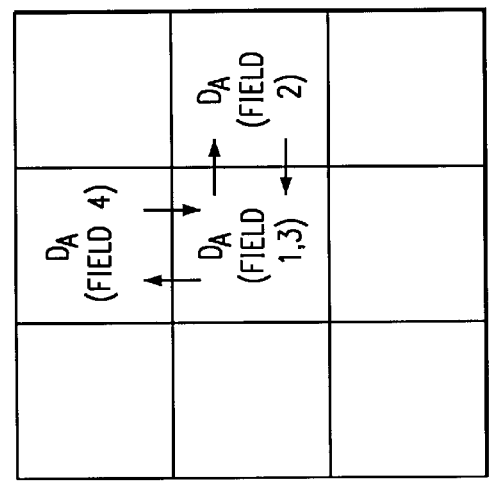
FIG. 14 illustrates an alternative rectangular dither pattern for offset correction for two-dimensional arrays.

FIG. 14 illustrates an alternative rectangular dither pattern for offset correction. FIG. 15 illustrates an alternative dither pattern for gain and offset correction.

Recursive Operation

The process of FIG. 3 (for one dimensional arrays) and FIG. 6 (for two dimensional arrays) may be performed over many iterations. Gain corrections are recursively applied to each new image, with each iteration reducing the gain differences among detector elements. Likewise, the recursive application of offset corrections to each new image reduces the offset differences among detector elements.

In practice, gain non uniformities are not expected to be as big as offset non uniformities, and a rather smoothed gain matrix should be obtained in a few iterations. Offset correction is anticipated to be applied continuously. Gain errors can be corrected in the beginning of an image sequence, or when there is major change in scene radiance. The residual gain errors will also be smoothed out in the offset correction loops.

Dither Correction Issues: Gradient Effects, Dither Bias, and Scene Motion

Gain errors are corrected at the beginning of an image sequence or when there is a major change in scene radiance.

As discussed above, gain ratios are calculated based on a pair of detector elements seeing the same scene gradiant at different times. If there is no local scene gradiant, the gain ratio cannot be obtained and no gain smoothing between the pair of detector elements can be performed. However, if there is no local scene gradiant, the residual gain errors can be treated as offset errors that will be smoothed out in the offset correction loops.

FIG. 16 illustrates the smoothing of gain errors for a "bland" scene (one with minimal scene gradiant). The offset correction will be valid until the scene flux starts to drift away from the flux level when the offset correction factors are estimated.

FIGS. 17A–17D illustrate how two detector elements might be exposed to slightly different scene paths, due to a dither bias. One path is shown with dotted lines, the other with solid lines. Detector element $D_A$ follows the path $\Phi_1$ to $\Phi_2$, whereas detector element $D_B$ follows the path $\Phi_1'$ to $\Phi_2'$.

"Dither bias" occurs when there is an error between the intended and the actual displacement of the dither array. It will not cause a major breakdown for the gain ratio calculations as long as the common scene path shared by the neighboring detector elements is parallel to the direction of maximum local scene gradiant. This is the case illustrated in FIG. 17A. When there is not enough scene gradiant along the dither path, as shown in FIGS. 17C and 17D, a good gain ratio estimate will be difficult to obtain, with or without dither bias. Theshholds can be set based on the direction and degree of the local gradient, as well as the dither path and dither bias.

Scene motion adds complexity to the gain correction is process. However, scene motion will possibly add another dimension in resolving the gain ratios among the detector elements. In other words, the gain ratio that cannot be resolved due to lack of local gradiant in the dithering direction can certainly be estimated if the scene changes so rapidly that the neighboring detector elements are experiencing the same scene dynamics during the same period of time.

It is anticipated that the gain correction error will be low if a reasonable threshhold is set to reject the ratios calculated under unstable dithering and/or scene conditions, in which case, the gain correction applied for those pixels can be derived from the last good frame or from a pre-calibration default. A weighted gain correction may also be defined such that at each gain correction cycle, the new correction factor will be weighted less ($\alpha<1$). This will result in a slower convergence in gain error smoothing, but the randomness of the errors, which are also lowered with the small weight, will eventually be cancelled out over several iterations.

$$\begin{bmatrix} \text{Weighted} \\ \text{Gain} \\ \text{Correction} \end{bmatrix} = (1-\alpha) + \alpha \begin{bmatrix} \text{Gain} \\ \text{Correction} \end{bmatrix}$$

$$= (1-\alpha) + \frac{\alpha}{N+1} \sum_{i=1}^{N+1} \frac{[\text{Gain}]_i}{[\text{Gain}]}$$

$$[\text{Image}] \cdot \begin{bmatrix} \text{Weighted} \\ \text{Gain} \\ \text{Correction} \end{bmatrix} = \left\{ (1-\alpha) \cdot [\text{Gain}] + \alpha \cdot \frac{1}{N+1} \sum_{i=1}^{N+1} [\text{Gain}]_i \right\}$$

$$[\Phi] + [\text{Offset}] \cdot \begin{bmatrix} \text{Weighted} \\ \text{Gain} \\ \text{Correction} \end{bmatrix}$$

Perfect dithering is not always possible and usually a fixed bias can be observed and/or measured. Random dither error does not cause the dither correction to break down because randomly generated noise tends to be smoothed out over time by the repeated smoothing in the offset correction process.

$$\begin{bmatrix} \text{Residual} \\ \text{Gain} \end{bmatrix} = (1-\alpha) \cdot [\text{Gain}] + \alpha \cdot \frac{1}{N+1} \sum_{i=1}^{N+1} [\text{Gain}]_i$$

FIG. 18A illustrates the effect when a constant fixed positive bias exists in the system. The arrows show the dither pattern for detector element $D_A$ during one cycle. In the first scene, the scene patch seen by $D_A$ at time t is shaded, and the areas outlined with dotted lines represent the scene patches seen by $D_A$ at later times in the same cycle. The scene patches are not connected to each other due to the positive dither bias. During the remainder of the cycle, the LL (lower left) neighboring detector elements of $D_A$ do not see exactly the same scene that was exposed to $D_A$ at time t. Instead, they each see a slightly different scene patch. The differences are shaded in the image scenes from t+1 to t+3.

The assumption that all neighboring detector elements see the same scene flux is violated, and the offset errors are wrongly estimated and corrected by the flux differences received by $D_A$ and by its neighbors. However, if there is no local scene gradiant in this region, then there is no flux difference between the dark gray region and the light gray region, and thus no errors will be introduced in the offset correction process.

FIG. 18B shows the dither bias effects when the offset correction value for $D_A$ is calculated from $D_A$ and its upper right (UR) neighboring detector elements. The dither bias generated correction error for UR correction has similar magnitude but opposite sign to the error generated during LL neighbor correction. The alternating correction pattern effectively cancels out the correction errors introduced by dither motion bias.

A weighting factor ($\alpha<1$) may be also applied during offset correction such that only fractions of the estimated offset errors are corrected at each cycle.

$$\begin{bmatrix} \text{Weighted} \\ \text{Offset} \\ \text{Correction} \end{bmatrix} = \alpha \begin{bmatrix} \text{Offset} \\ \text{Correction} \end{bmatrix}$$

$$= \alpha \cdot [\text{Offset}] - \frac{\alpha}{N+1} \cdot \sum_{i=1}^{N+1} [\text{Offset}]_i$$

$$[\text{Image}] - \begin{bmatrix} \text{Weighted} \\ \text{Offset} \\ \text{Correction} \end{bmatrix} =$$

$$g \cdot [\Phi] + (1-\alpha) \cdot [\text{Offset}] + \alpha \cdot \frac{1}{N+1} \cdot \sum_{i=1}^{N+1} [\text{Offset}]_i$$

$$\begin{bmatrix} \text{Residual} \\ \text{Offset} \end{bmatrix} = (1-\alpha) \cdot [\text{Offset}] + \alpha \cdot \frac{1}{N+1} \sum_{i=1}^{N+1} [\text{Offset}]_i.$$

This partial correction results in slightly slower convergence of the true offset errors, but significantly lowers the errors introduced by dithering motion bias.

When the scene moves fast enough, the fixed step dithering fails to line up the neighboring detector elements so that they see exactly the same scene flux during one correction cycle. FIGS. 19A and 19B illustrate the relationship between the dithered scene and the moving scene in the simple one-step dithering case. In the example of FIGS. 19A and 19B, the detector elements are dithered one scene pixel to the right from time t to t+1. At time t+2, detector elements are dithered back (left) to see the same scene at time t. For the stationary scene of FIG. 18A, detector elements $D_A$ and $D_B$ are exposed to the same scene flux during this time period. When the scene starts to move toward the left, the detector elements see slightly different scene fluxes each time. If the scene is moving with a constant velocity, and dither is occurring in a regular sample period, the differences between the scene fluxes seen by detectors DA and DB can be predicted as:

$$\Phi_B(t+1) = \frac{1}{2} \cdot \{\Phi_A(t) + \Phi_A(t+2)\}$$

The basic offset correction formula for the one-step dither case is described as:

$$\text{Offset\_Corr}_A = I_A(t) - \frac{1}{2}\{I_A(t) + I_B(t+1)\}$$

$$= \frac{1}{2}\{I_A(t) - I_B(t+1)\}$$

where $I_A(t) = g \cdot \Phi_A(t) + \text{Offset}_A$ $I_B(t+1) = g \cdot \Phi_B(t+1) + \text{Offset}_B$ $I_A(t+2) = g \cdot \Phi_A(t+2) + \text{Offset}_A$ The scene compensated offset correction may be defined as:

$$\text{Offset\_Corr\_SC}_A = \frac{1}{2} \cdot \left\{\frac{1}{2} \cdot [I_A(t) + I_A(t+2)] - I_B(t+1)\right\}$$

With proper substitution from the above equations and definitions, the calculated offset correction value for $D_A$ becomes:

$$\text{Offset\_Corr\_SC}_A = \frac{1}{2} \cdot \left\{g \cdot \frac{1}{2}[\Phi_A(t) + \Phi_A(t+2)] + \text{Offset}_A - [g \cdot \Phi_B(t+1) + \text{Offset}_B]\right\}$$

$$= \frac{1}{2} \cdot (\text{Offset}_A - \text{Offset}_B)$$

After applying the scene compensated offset correction to $D_A$'s response, the corrected image response and the residual offset error for $D_A$ becomes:

$$I_A(t) - \text{Offset\_Corr\_SC}_A = g \cdot \Phi_A(t) + \text{Offset}_A - \frac{1}{2}(\text{Offset}_A - \text{Offset}_B)$$

$$= g \cdot \Phi_A(t) + \frac{1}{2} \cdot (\text{Offset}_A + \text{Offset}_B)$$

$$\begin{bmatrix} \text{Residual} \\ \text{Offset} \end{bmatrix}_A = \frac{1}{2} \cdot (\text{Offset}_A + \text{Offset}_B)$$

The above derivations prove that if the scene velocity is instantaneously and locally constant, proper averaging of sequential frames will be able to compensate the correction errors resulting from the scene motion in the dither correction process.

Non-Integer Pixel Dithering

"Non-integer dithering" is dithering that is not equal to the dimension of one pixel, either in the horizontal or vertical direction. As an example, for half-pixel dithering, the dither equations for full-pixel dithering can be modified. FIG. 20 illustrates a half-pixel dither pattern.

For half-pixel dithering, the gain correction uses the same formula as for full pixel dithering as long as the common scene path parallels the direction with maximum scene gradiant. The offset correction formulas become:

$$\text{Offset\_corr}_A^{(1)} = \alpha \cdot \left[\frac{1}{2} \cdot \{I_A(t) + I_B(t)\} - I_B(t+1)\right]$$

$$\text{Offset\_corr}_A^{(2)} = \alpha \cdot \left[\frac{1}{2} \cdot \{I_A^{(1)}(t+1) + I_C^{(1)}(t+1)\} - I_C^{(1)}(t)\right]$$

Here $I_B$ and $I_C$ represent the output of two neighboring detector elements, $D_B$ and $D_C$, of detector $D_A$ from opposite directions. As indicated, the first term uses non-dithered output values (not from the same location), whereas the second term uses a dithered output value (from the same scene location as the current detector element). FIG. 21 illustrates these values in relation to the dither pattern.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A one-dimensional method of calculating gain correction values to compensate gain errors of detector elements of an infrared detector array, where each detector element of said array has at least one neighbor, comprising the steps of:

receiving two sets of output values, each set representing two columns of output data from said array, said sets being from a first field and a second field scanned by said array;

correcting said output values with previously calculated gain correction values, if any;

calculating new gain correction values by (1) differencing said output values in said two columns in said first field to obtain a first set of difference values, (2) differencing said output values in said two columns in said second field to obtain a second set of difference values, and (3) for each detector element calculating at least one neighbor gain ratio associated with a neighbor detector element, each said neighbor gain ratio being calculated by dividing the difference value in said first set associated with the neighbor by a difference value in said second set associated with that detector element, and averaging said neighbor gain ratio with a unity value;

updating said previously calculated gain correction values; and repeating the above steps for successive pairs of columns from said first and second fields.

2. The method of claim 1, wherein said receiving step is performed such that said two columns are adjacent.

3. The method of claim 1, wherein said receiving step is performed such that said two fields are dithered a distance substantially equal to the dimension of one detector element in the cross direction of said scan.

4. The method of claim 1, wherein said receiving step is performed such that said two fields are dithered a distance less than the dimension of one detector element in the cross direction of said scan.

5. The method of claim 1, wherein said calculating step is further performed by obtaining one or more additional neighbor gain ratios and by including said neighbor gain ratios in said averaging.

6. The method of claim 1, wherein said steps are repeated until said new gain correction values become substantially constant.

7. The method of claim 1, wherein said array is a one-dimensional scanning array and said receiving step is performed such that said fields are dithered in the cross-direction of the scanning direction of said array.

8. The method of claim 1, wherein said array is a two-dimensional array and further comprising the step of repeating the method for a second dimension of said array.

9. The method of claim 1, wherein said calculating step is performed with an even number of neighbors, said neighbors forming a symmetrical pattern with respect to that detector element.

10. A one-dimensional method of calculating offset correction values to compensate offset errors of detector elements of an infrared detector array, where each detector element of said array has at least one neighbor, comprising the steps of:

receiving two sets of output values, each set representing a column of output data from said array, said sets being from a first field and a second field scanned by said array;

correcting said output values with previously calculated offset correction values, if any;

calculating first new offset correction values by performing the following operations for each detector element: averaging an output value of at least one first neighbor and an output value of that detector element, and subtracting the average from the output value of that detector element correcting said output values with said first new offset correction values;

calculating second new offset correction values by performing the following operations for each detector element: averaging an output value of at least one second neighbor and an output value of that detector element, and subtracting the average from the output value of that detector element;

updating said previously calculated offset correction values, if any, with said first new offset correction values and said second new offset correction values; and repeating the above steps for successive columns from said first and second fields.

11. The method of claim 10, wherein said receiving step is performed such that said two fields are dithered a distance substantially equal to the dimension of one detector element in the cross direction of said scan.

12. The method of claim 10, wherein said receiving step is performed such that said two fields are dithered a distance less than the dimension of one detector element in the cross direction of said scan.

13. The method of claim 10, wherein said calculating steps are further performed by including output values from one or more additional neighbors in said averaging.

14. The method of claim 10, wherein said steps are repeated until said second new offset correction values become substantially constant.

15. The method of claim 10, wherein said array is a one-dimensional scanning array and said receiving step is performed such that said fields are dithered in the cross-direction of the scanning direction of said array.

16. The method of claim 10, wherein said array is a two-dimensional array and further comprising the step of repeating the method for a second dimension of said array.

17. The method of claim 10, wherein said calculating steps are performed with an even number of neighbors, said neighbors forming a symmetrical pattern with respect to that detector element.

18. A method of calculating gain correction values to compensate gain errors of responses of detector elements of a two-dimensional infrared detector array, comprising the steps of:

receiving multiple fields of data representing output values of said array, each field having been detected at a different dither position of said array, each dither position being such that neighboring detector elements of said array are exposed to the same scene path;

correcting each of said output values in said multiple fields with previously calculated gain correction values, if any;

calculating new gain correction values by performing the following calculations for each detector element: (1) differencing output values in different fields of at least one neighbor of that detector element and of that detector element, thereby obtaining a set of one or more difference values associated with that detector element, (2) dividing each difference value by the difference value of that detector element, thereby obtaining a set of one or more gain ratios, and (3) averaging said gain ratios, said averaging including a unity term; and updating said previously calculated gain correction values, if any, with said new gain correction values.

19. The method of claim 18, wherein said receiving step is performed such that said fields are detected at dither positions that form a rectangular pattern.

20. The method of claim 18, wherein said receiving step is performed such that said fields are detected at dither positions that form a diagonal pattern.

21. The method of claim 18, wherein said receiving step is performed such that said fields are dithered a distance substantially equal to a dimension of one detector element.

22. The method of claim 18, wherein said receiving step is performed such that said fields are dithered a distance less than a dimension of one detector element.

23. The method of claim 18, further comprising the step of repeating all of said steps until said new gain correction values become substantially constant.

24. A method of calculating offset correction values to compensate offset errors of responses of detector elements of a two-dimensional infrared detector array, comprising the steps of:

receiving multiple fields of data representing output values of said array, each field having been detected at a different dither position of said array, each dither position being such that at least one first neighboring detector element is exposed to the same scene flux;

correcting said output values with previously calculated offset correction values, if any;

calculating first new offset correction values by performing the following calculation for each detector element: averaging output values of said at least one first neighboring detector element and the output value of that detector element, and subtracting the average from the output value of that detector element;

updating said previously calculated offset correction values, if any, with said first new offset correction values;

receiving next multiple fields of data representing next output values of said array, each field having been detected at a different dither position of said array, each dither position being such that at least one second neighboring detector element is exposed to the same scene flux;

correcting said next output values with the result of said updating step; and calculating second new offset correction values by performing the following calculation for each detector element, using said next output values: averaging output values of said at least one second neighboring detector element and the output value of that detector element, and subtracting the average from the output value of that detector element; and updating the results of said updating step, using said second new offset correction values.

25. The method of claim 24, wherein said receiving step is performed such that said fields are detected at dither positions that form a rectangular pattern.

26. The method of claim 24, wherein said receiving step is performed such that said fields are detected at dither positions that form a diagonal pattern.

27. The method of claim 24, wherein said receiving step is performed such that said fields are dithered a distance substantially equal to a dimension of one detector element.

28. The method of claim 24, wherein said receiving step is performed such that said fields are dithered a distance less than a dimension of one detector element.

29. The method of claim 24, further comprising the step of repeating all of said steps until said new offset correction values become substantially constant.

30. The method of claim 24, wherein said receiving step is performed such that said neighboring detector elements represent the complemented neighbors of neighboring detector elements used in calculating previous offset correction values.

31. The method of claim 18, wherein said calculating step is performed with an even number of neighbors, said neighbors forming a symmetrical pattern with respect to that detector element.

32. The method of claim 24, wherein said rectangular pattern is an L-shaped pattern.

33. The method of claim 24, wherein said calculating steps are performed with an even number of neighbors, said neighbors forming a symmetrical pattern with respect to that detector element.

* * * * *

UNITED STATES PATENT AND TRADEMARK OFFICE
CERTIFICATE OF CORRECTION

Patent No.: 5,925,880
Dated: July 20, 1999
Inventor(s): Young, et al.

It is certified that error appears in the above-identified patent and that said Letters Patent is hereby corrected as shown below:

Column 5, line 22, after "in", delete "[101]" and insert --[Φ]--.
Column 6, line 30, after "and", delete "32" and insert --3B--.
Column 10, line 15, after "from", delete "is".
Column 11, line 12, after "4", delete "Δ" and insert -- __ --.
Column 14, line 27, after "[Φ]→,", delete "[Φ]←", and insert --[Φ] ⌐--
Column 14, line 42, after "[$I_{Field 2}$]", delete "-" and insert -- = --.
Column 16, line 48, after "to", delete "he" and insert --be--.
Column 19, line 34, after "correction", delete "is".

Signed and Sealed this

Thirtieth Day of May, 2000

*Attest:*

Q. TODD DICKINSON

*Attesting Officer*  *Director of Patents and Trademarks*